(12) United States Patent
Klinkner et al.

(10) Patent No.: US 11,265,716 B2
(45) Date of Patent: *Mar. 1, 2022

(54) END-TO-END ENCRYPTION WITH DISTRIBUTED KEY MANAGEMENT IN A TRACKING DEVICE ENVIRONMENT

(71) Applicant: Tile, Inc., San Mateo, CA (US)

(72) Inventors: Steven R. Klinkner, Palo Alto, CA (US); Josselin de la Broise, Mountain View, CA (US)

(73) Assignee: Tile, Inc., San Mateo, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 16/702,273

(22) Filed: Dec. 3, 2019

(65) Prior Publication Data

US 2021/0092599 A1 Mar. 25, 2021

Related U.S. Application Data

(60) Provisional application No. 62/902,582, filed on Sep. 19, 2019.

(51) Int. Cl.
*H04W 12/104* (2021.01)
*H04W 4/029* (2018.01)
(Continued)

(52) U.S. Cl.
CPC ............ *H04W 12/104* (2021.01); *G06F 9/54* (2013.01); *G06F 16/9537* (2019.01);
(Continued)

(58) Field of Classification Search
CPC ............... H04W 12/104; H04W 12/63; H04W 12/04733; H04W 12/0431; H04W 12/047;
(Continued)

(56) References Cited

U.S. PATENT DOCUMENTS 6,058,309 A  5/2000 Huang et al.
7,114,175 B2  9/2006 Lahteenmaki
(Continued)

FOREIGN PATENT DOCUMENTS

WO  WO 2014/042507  3/2014
WO  WO 2016/036858 A1  3/2016

OTHER PUBLICATIONS

United States Office Action, U.S. Appl. No. 16/546,122, filed Jul. 13, 2021, 80 pages.
(Continued)

*Primary Examiner* — Viral S Lakhia
(74) *Attorney, Agent, or Firm* — Fenwick & West LLP

(57) ABSTRACT

A tracking device can provide a hashed identifier to a mobile device, for instance within an advertisement packet. The mobile device can query each of a plurality of entities with the hashed identifier to identify an entity associated with the hash key used to generate the hashed identifier. In some embodiments, the mobile device can query a centralized key server, which in turn can query the plurality of entities to identify the entity associated with the hash key. The mobile device can then receive a public key from the identified entity, can determine a location of the mobile device, and can encrypt the location with the public key. The mobile device can then provide the hashed identifier and the encrypted location to the identified entity, which can provide the encrypted location to an owner of the tracking device for decryption using a private key corresponding to the public key.

19 Claims, 15 Drawing Sheets

(51) Int. Cl.
| | |
|---|---|
| *H04L 9/06* | (2006.01) |
| *H04W 12/033* | (2021.01) |
| *H04W 12/0471* | (2021.01) |
| *G06F 16/9537* | (2019.01) |
| *H04W 12/63* | (2021.01) |
| *H04W 12/0433* | (2021.01) |
| *H04W 12/0431* | (2021.01) |
| *G06F 9/54* | (2006.01) |
| *H04L 9/30* | (2006.01) |
| *H04L 9/32* | (2006.01) |

(52) U.S. Cl.
CPC .............. *H04L 9/0643* (2013.01); *H04L 9/30* (2013.01); *H04L 9/3242* (2013.01); *H04W 4/029* (2018.02); *H04W 12/033* (2021.01); *H04W 12/0431* (2021.01); *H04W 12/0433* (2021.01); *H04W 12/0471* (2021.01); *H04W 12/63* (2021.01)

(58) Field of Classification Search
CPC ........ H04W 4/029; H04L 9/0643; H04L 9/30; H04L 9/3242; G06F 16/9537; G06F 9/54
See application file for complete search history.

(56) References Cited

U.S. PATENT DOCUMENTS

| | | |
|---|---|---|
| 7,502,972 B1 | 3/2009 | Chilukuri et al. |
| 7,983,419 B2 | 7/2011 | Fan et al. |
| 8,280,351 B1 | 10/2012 | Ahmed et al. |
| 8,401,185 B1 | 3/2013 | Telang |
| 8,538,028 B2 | 9/2013 | Yeap et al. |
| 8,611,321 B2 | 12/2013 | Herrala et al. |
| 8,817,712 B2 | 8/2014 | Shin et al. |
| 8,839,386 B2 | 9/2014 | Gilboy |
| 8,869,248 B2 | 10/2014 | Moosavi et al. |
| 9,256,657 B1 | 2/2016 | Evenson et al. |
| 9,357,348 B2 | 5/2016 | Evans et al. |
| 9,525,971 B1 | 12/2016 | Vega et al. |
| 9,654,916 B2 | 5/2017 | de la Broise |
| 9,964,623 B1 | 5/2018 | de la Broise et al. |
| 10,111,032 B2 | 10/2018 | Vega et al. |
| 10,237,259 B2 | 3/2019 | Ronda et al. |
| 10,506,386 B1 | 12/2019 | de la Broise et al. |
| 10,530,806 B2* | 1/2020 | Starink ............... H04L 63/1416 |
| 10,568,035 B1 | 2/2020 | Tong |
| 10,575,138 B1 | 2/2020 | Klinkner et al. |
| 10,735,397 B2 | 8/2020 | Ronda et al. |
| 10,757,676 B1 | 8/2020 | de la Broise et al. |
| 10,929,738 B1* | 2/2021 | Balganon ............... H04W 12/63 |
| 10,992,797 B2 | 4/2021 | Klinkner et al. |
| 11,128,478 B2* | 9/2021 | Galdo ................... H04L 9/3263 |
| 2002/0061748 A1 | 5/2002 | Nakakita et al. |
| 2003/0181215 A1 | 9/2003 | Cromer et al. |
| 2003/0207683 A1 | 11/2003 | Lempio et al. |
| 2003/0233458 A1 | 12/2003 | Kwon et al. |
| 2004/0192352 A1 | 9/2004 | Vallstrom et al. |
| 2004/0255137 A1 | 12/2004 | Ying |
| 2006/0046689 A1 | 3/2006 | Kim |
| 2006/0072747 A1 | 4/2006 | Wood et al. |
| 2006/0229896 A1 | 10/2006 | Rosen et al. |
| 2007/0074019 A1 | 3/2007 | Seidel |
| 2007/0113092 A1 | 5/2007 | Nishida et al. |
| 2007/0167175 A1 | 7/2007 | Wong et al. |
| 2007/0229350 A1 | 10/2007 | Scalisi et al. |
| 2008/0143516 A1 | 6/2008 | Mock et al. |
| 2008/0182592 A1 | 7/2008 | Cha et al. |
| 2008/0186162 A1 | 8/2008 | Rajan et al. |
| 2008/0287143 A1 | 11/2008 | Banks et al. |
| 2008/0303901 A1 | 12/2008 | Variyath et al. |
| 2009/0002188 A1 | 1/2009 | Greenberg |
| 2009/0239502 A1 | 9/2009 | Dempo et al. |
| 2009/0323972 A1 | 12/2009 | Kohno et al. |
| 2010/0064138 A1 | 3/2010 | Hwang et al. |
| 2010/0164714 A1 | 7/2010 | Buller et al. |
| 2010/0199339 A1 | 8/2010 | Kageyama |
| 2010/0273452 A1 | 10/2010 | Rajann et al. |
| 2011/0231092 A1 | 9/2011 | Kuo et al. |
| 2011/0273334 A1 | 11/2011 | Karr |
| 2012/0154115 A1 | 6/2012 | Herrala |
| 2012/0218078 A1 | 8/2012 | Hill |
| 2012/0309422 A1 | 12/2012 | Lewis-Evans et al. |
| 2013/0069782 A1 | 3/2013 | Duggal et al. |
| 2013/0152216 A1 | 6/2013 | Stevens |
| 2013/0197859 A1 | 8/2013 | Albano et al. |
| 2013/0217332 A1 | 8/2013 | Altman et al. |
| 2014/0006129 A1 | 1/2014 | Heath |
| 2014/0062695 A1 | 3/2014 | Rosen et al. |
| 2014/0085089 A1 | 3/2014 | Rasband et al. |
| 2014/0162693 A1 | 6/2014 | Wachter et al. |
| 2014/0189346 A1 | 7/2014 | Cureton |
| 2014/0214855 A1 | 7/2014 | Attaluri et al. |
| 2014/0274135 A1 | 9/2014 | Edge et al. |
| 2014/0274136 A1 | 9/2014 | Edge et al. |
| 2014/0282974 A1 | 9/2014 | Maher et al. |
| 2014/0327518 A1 | 11/2014 | Loutit |
| 2015/0006666 A1 | 1/2015 | Backholm et al. |
| 2015/0052358 A1 | 2/2015 | Udupi et al. |
| 2015/0086018 A1 | 3/2015 | Harjula et al. |
| 2015/0160328 A1 | 6/2015 | Peinhardt et al. |
| 2015/0168173 A1 | 6/2015 | Lewis-Evans et al. |
| 2015/0237018 A1 | 8/2015 | Parry et al. |
| 2015/0319151 A1 | 11/2015 | Chastain et al. |
| 2016/0050530 A1* | 2/2016 | Corbalis ............... H04W 12/02 455/456.1 |
| 2016/0105764 A1 | 4/2016 | Evans et al. |
| 2016/0105765 A1 | 4/2016 | Farley et al. |
| 2016/0105766 A1 | 4/2016 | de la Broise |
| 2016/0154963 A1 | 6/2016 | Kumar et al. |
| 2016/0241660 A1 | 8/2016 | Nhu |
| 2016/0323114 A1 | 11/2016 | Sulpizio |
| 2017/0069014 A1* | 3/2017 | Minelli ................... G06F 16/48 |
| 2017/0085542 A1 | 3/2017 | Avanzi et al. |
| 2017/0155514 A1 | 6/2017 | Schulz et al. |
| 2017/0171180 A1 | 6/2017 | Forood et al. |
| 2017/0250972 A1 | 8/2017 | Ronda et al. |
| 2017/0324614 A1 | 11/2017 | de Barros Chapiewski et al. |
| 2017/0338948 A1 | 11/2017 | Boehl et al. |
| 2018/0115413 A1 | 4/2018 | King |
| 2018/0293387 A1 | 10/2018 | Bar-El et al. |
| 2018/0317266 A1 | 11/2018 | Britt et al. |
| 2018/0337778 A1 | 11/2018 | Scheiblauer et al. |
| 2019/0044708 A1 | 2/2019 | Dewan |
| 2019/0141474 A1* | 5/2019 | de la Broise ........... H04L 67/18 |
| 2019/0245885 A1* | 8/2019 | Starink ............... H04L 63/1441 |
| 2019/0312720 A1 | 10/2019 | Liu et al. |
| 2019/0340251 A1 | 11/2019 | Peddada et al. |
| 2019/0370271 A1 | 12/2019 | Christensen |
| 2020/0013043 A1* | 1/2020 | Smets .............. G06Q 20/40145 |
| 2020/0052905 A1* | 2/2020 | Mathias ................ H04L 9/0861 |
| 2020/0107164 A1* | 4/2020 | Lopatin ................. G01S 5/0045 |
| 2020/0259650 A1 | 8/2020 | Montemurro et al. |
| 2020/0259908 A1 | 8/2020 | Klinkner et al. |
| 2020/0404091 A1 | 12/2020 | Klinkner et al. |
| 2020/0410113 A1 | 12/2020 | Gryb et al. |
| 2021/0168979 A1 | 6/2021 | Yang et al. |

OTHER PUBLICATIONS

United States Office Action, U.S. Appl. No. 16/702,276, filed Jun. 7, 2021, 28 pages.

International Search Report and Written Opinion, Patent Cooperation Treaty Application No. PCT/US2020/044344, dated Nov. 6, 2020, twelve pages.

* cited by examiner

END-TO-END ENCRYPTION WITH DISTRIBUTED KEY MANAGEMENT IN A TRACKING DEVICE ENVIRONMENT

CROSS REFERENCE TO RELATED APPLICATIONS

This application claims priority to and the benefit of U.S. Provisional Application No. 62/902,582, filed Sep. 19, 2019, the contents of which are incorporated herein by reference in their entirety.

BACKGROUND

This disclosure relates generally to locating a tracking device, and more specifically, to securely providing location and identity information for a tracking device in a tracking device environment.

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object, (e.g., if it becomes lost).

Tracking device systems access and provide identifying and location-based information to users within the tracking device environment. Thus, there is a need for secure end-to-end protection for such information from the point of creation at the tracking device and mobile device that detects the tracking device, to the centralized tracking server, to the owner of the tracking device.

Figure 1:
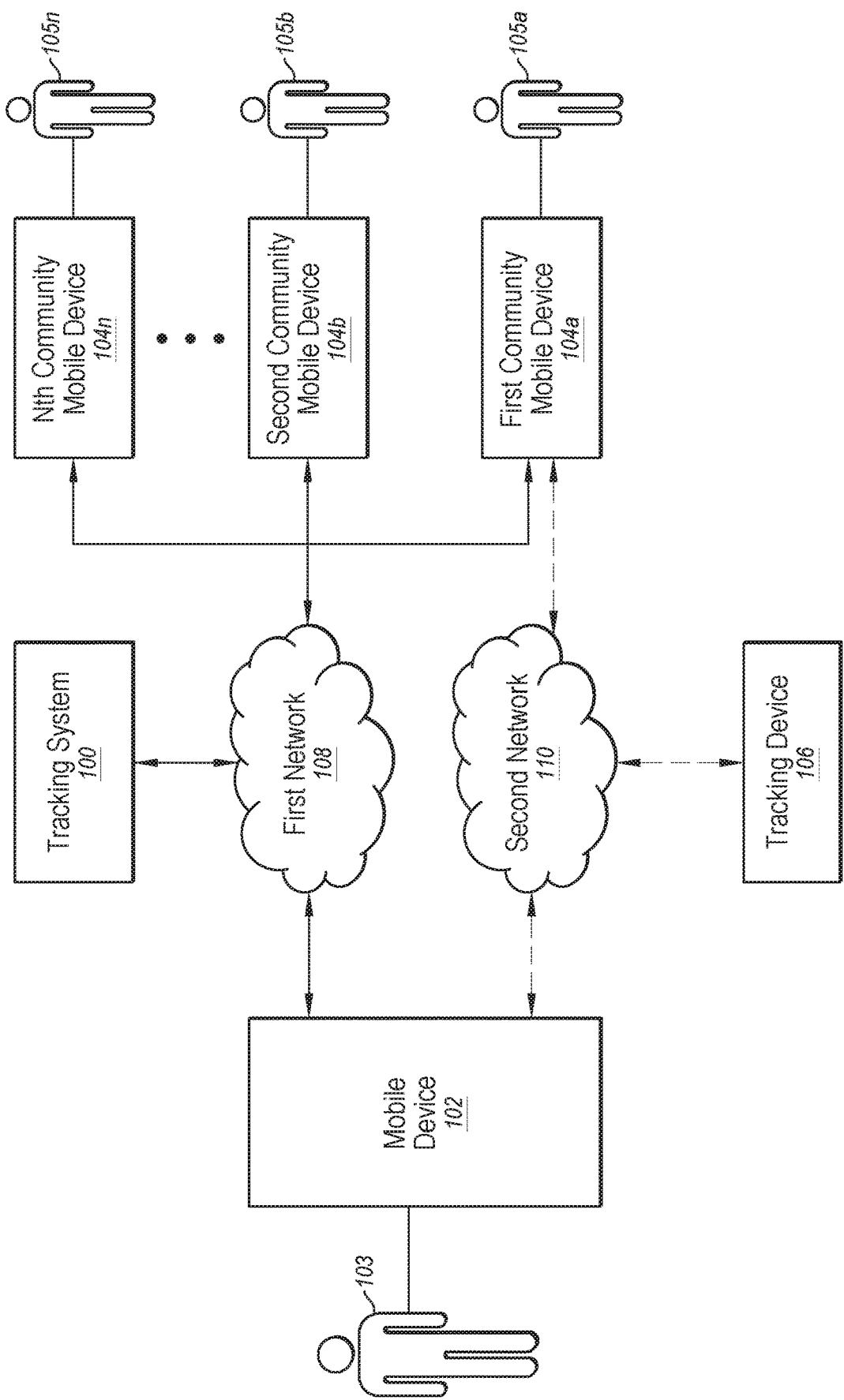
FIG. 1 illustrates an exemplary implementation for locating a tracking device according to principles described herein.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments described herein provide a user with the ability to locate one or more low-power tracking devices by leveraging the capabilities of a plurality of mobile devices associated with a community of users (e.g., users of the same tracking device system) in a secure and privacy-focused environment.

A user can attach a tracking device to or enclose the tracking device within an object, such as a wallet, keys, a car, a bike, a pet, or any other object that the user wants to track. The user can then use a mobile device (e.g., by way of a software application installed on the mobile device) to track the tracking device and corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the principles described herein allow the user to leverage the capabilities of a community of users of a tracking device system.

In particular, a tracking system (also referred to herein as a "cloud server" or simply "server") can maintain user profiles associated with a plurality of users of the system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate and track down the tracking device.

In addition to utilizing a general community of users, a user of the tracking system may desire to utilize the tracking capabilities of a specific group of one or more known users (e.g., friends or family of the user). For example, a user may indicate one or more friends or other users with which a tracking device may be shared. Sharing the tracking device may provide the ability for a friend to quickly determine if a tracking device is close-by without also querying a larger community of users, or to enable a friend to contact a user directly with information about the location of a lost tracking device.

Environment Overview

FIG. 1 illustrates an exemplary implementation in which a tracking system 100 is communicatively coupled to a mobile device 102 associated with the user 103 and a plurality of community mobile devices 104a through 104n (collectively referred to herein as "community mobile devices 104") associated with a plurality of users 105a through 105n of the tracking system 100 (collectively referred to herein as "community users 105"). As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. Accordingly, the mobile device 102 and community mobile devices 104 are only able to communicate with the tracking device 106 if they are within a close proximity to the tracking device. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 116. For example, an implementation may include a first community mobile device 112a associated with a first community user 116a, a second community mobile device 112b associated with a second community user 116b, and additional communication mobile devices associated with additional community users up to an nth community mobile device 112n associated with an nth community user 116n. The community mobile devices 112 may also include functionality that enables each community mobile device 112 to identify a tracking device 106 within a proximity of the community mobile device 112. In one example, a first community mobile device 112a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may constantly transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102. In some cases, the strength of signal or absence of a signal may be used to indicate that a tracking device 106 is lost.

System Overview

Figure 2:
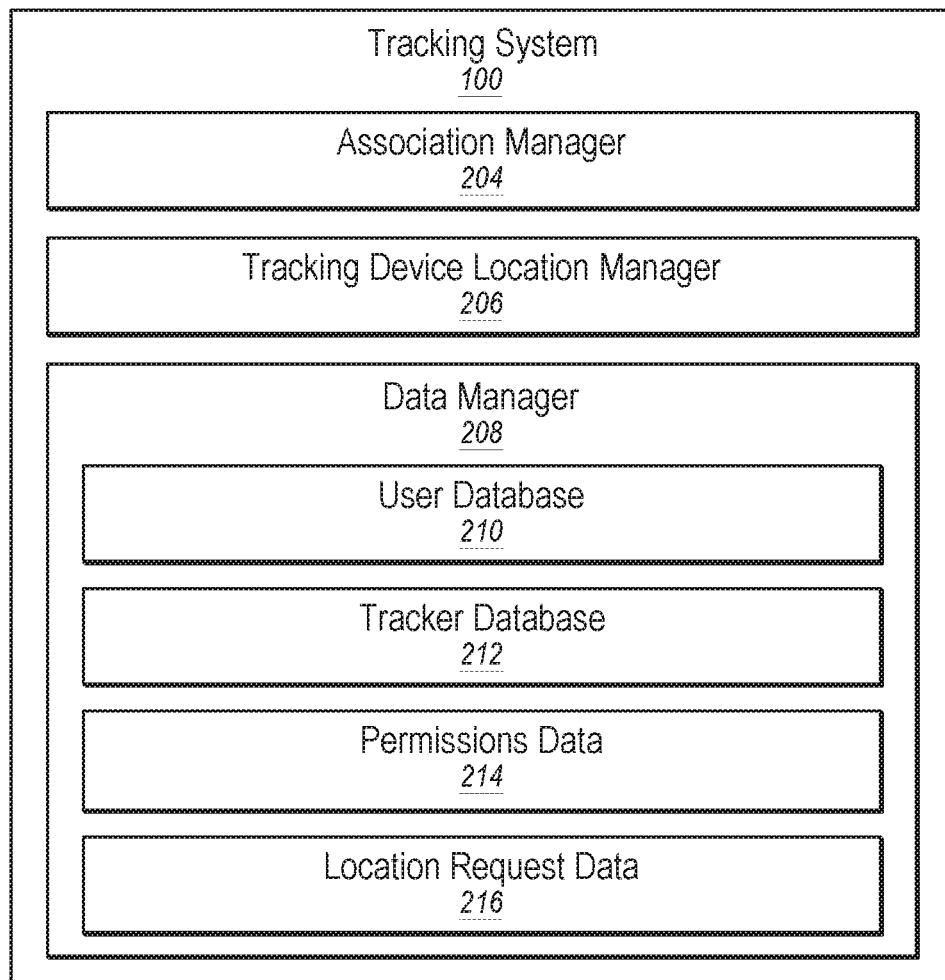
FIG. 2 illustrates an exemplary tracking system of the implementation of FIG. 1.

FIG. 2 illustrates a diagram showing example components of the tracking system 100. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106. The tracking device location manager 206 may also be used to receive and process a response to a tracking request that is received from one or more community mobile devices 104 that detect the tracking device 106 and respond to the tracking request. For example, the tracking system 100 may receive a response to the tracking request indicating a location within a proximity of the tracking device 106 and provide a last known location within a proximity of the tracking device 106 as provided by the community mobile device 104.

In one configuration, the tracking device location manager 206 may receive an indication that a tracking device 106 is lost from the mobile device 102 and store the lost indication on a database. When the tracking device location manager 206 receives an indication that the tracking device 106 is lost, the tracking device location manager 206 may set a flag indicating that the tracking device 106 is lost. Setting a flag for a tracking device 106 may include storing and/or associating a value associated with the tracking device that indicates that the tracking device 106 is lost. This may include setting a flag, marker, digital value, or other indication that the tracking device 106 is lost and maintaining or storing the indication of the lost tracking device 106 on the tracking system 100 (e.g., on a database).

The tracking device location manager 206 may further receive updated locations from the community of mobile devices 104 that are constantly scanning for nearby tracking devices 106. In this example, the tracking device location manager 206 may receive location updates from the community of mobile devices 104 and, based on the tracking device 106 being indicated as lost, provide a response to a lost indication to the mobile device 102. The response to the lost indication may be a text message, push notification, ring tone, automated voice message, or other response for informing a user 103 that a tracking device 106 has been found and/or an updated location of the tracking device 106.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting a proximity of the tracking device 106. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate a tracking device 106 using an account and/or mobile device 102 associated with the user 103. Location request data 216 may include information related to a location request or a lost indication received from the user 103 via a mobile device 102.

Figure 3:
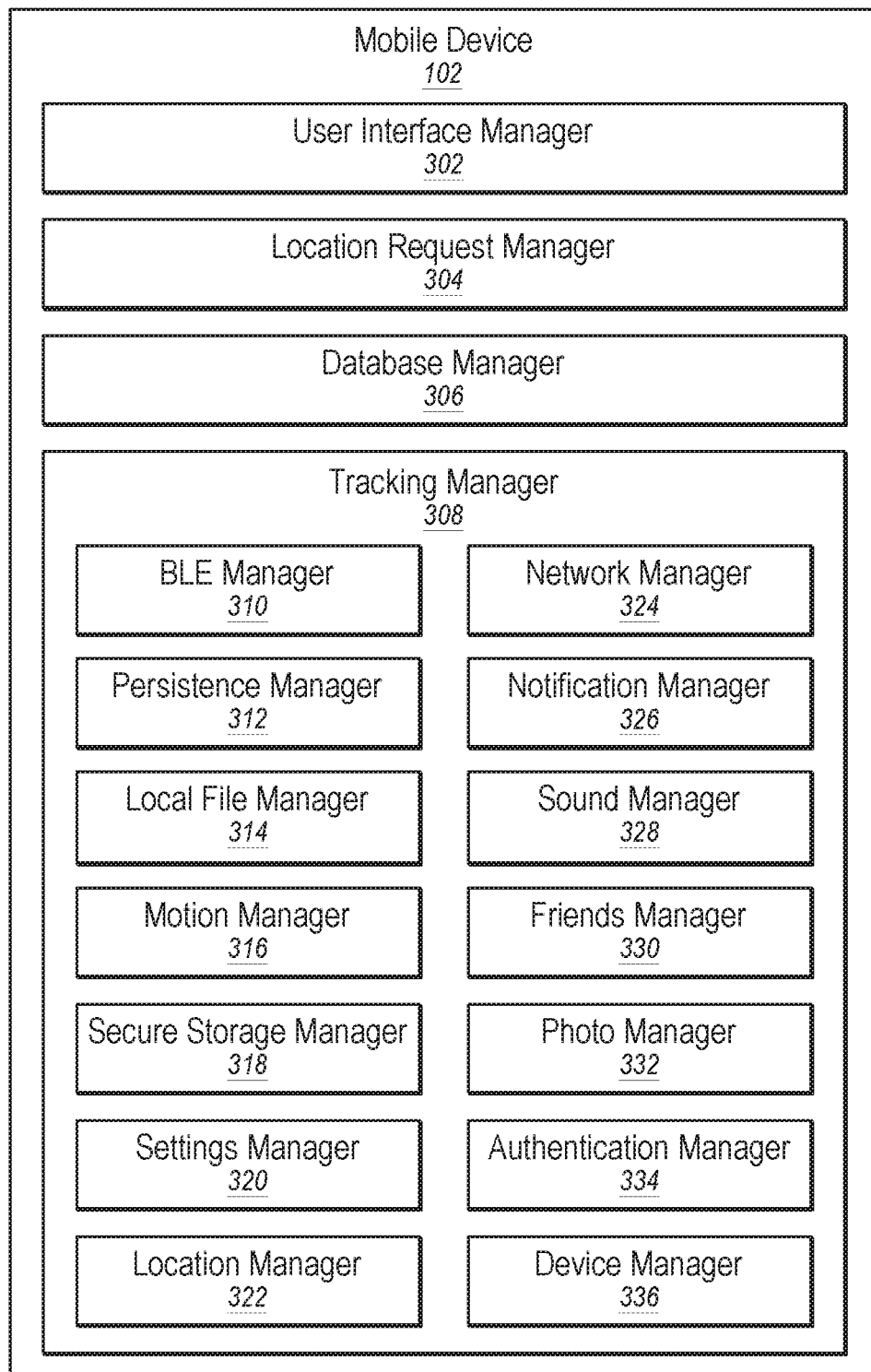
FIG. 3 illustrates an exemplary user mobile device of the implementation of FIG. 1.

FIG. 3 illustrates a diagram showing example components of the mobile device 102. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
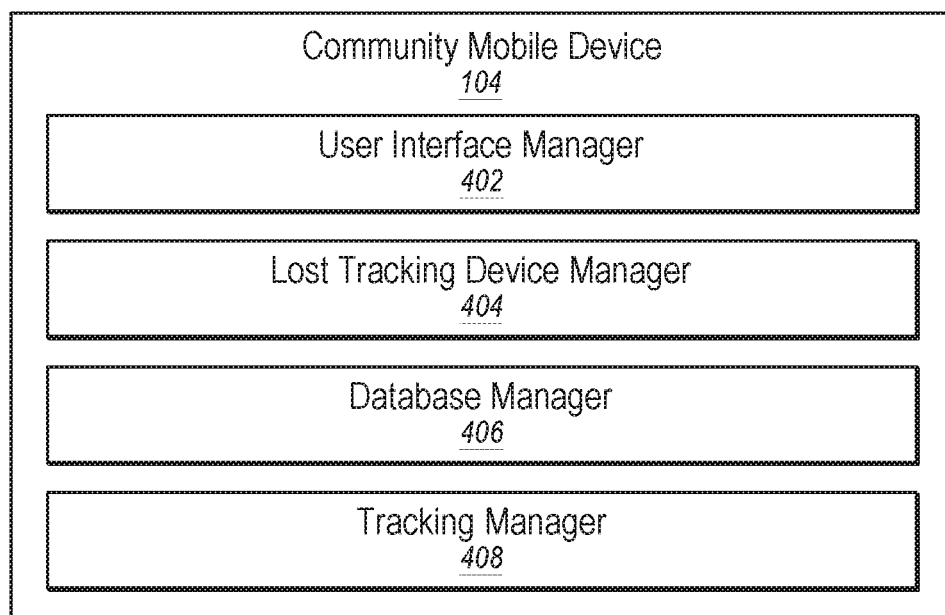
FIG. 4 illustrates an exemplary community mobile device of the implementation of FIG. 1.

FIG. 4 illustrates a diagram showing example components of a community mobile device 104. As shown, the community mobile device 104 may include, but is not limited to, a user interface manager 402, a lost tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a lost tracking device manager 404. The lost tracking device manager 404 may facilitate scanning for nearby tracking devices 106. In some configurations, the lost tracking device manager 404 can continuously or periodically scan (e.g., once per second) for nearby tracking devices 106. The lost tracking device manager 404 may determine whether to provide an updated location of the nearby tracking device 106 to the tracking system 100. In some configurations, the lost tracking device manager 404 provides a location of a nearby tracking device 106 automatically. Alternatively, the lost tracking device manager 404 may determine whether the location of the tracking device 106 has been recently updated, and determine whether to provide an updated location based on the last time a location of the tracking device 106 has been updated (e.g., by the community mobile device 104). For example, where the community mobile device 104 has provided a recent update of the location of a tracking device 106, the lost tracking device manager 404 may decide to wait a predetermined period of time (e.g., 5 minutes) before providing an updated location of the same tracking device 106.

In one configuration, the lost tracking device manager 404 may receive and process a location request or other information relayed to the community mobile device 104 by the tracking system 100. For example, the lost tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the lost tracking device manager 404 may generate and transmit a response to the location request to the tracking system 100, which may be provided to the user 103 associated with the lost tracking device 106. Further, generating and transmitting the response to the tracking request may be conditioned on the status of the tracking device 106 being flagged as lost by the mobile device 102 and/or the tracking system 100.

The lost tracking device manager 404 may additionally provide other information to the tracking system 100 in response to receiving the tracking request. For example, in addition to providing a location of the community mobile device 104, the lost tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the lost tracking device manager 404 may determine whether to send a location within the proximity of the tracking device 106 to the tracking system 100. The determination of whether to send a location to the tracking system 100 may be based on a variety of factors. For example, a lost tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Hash-Based Location Tracking

Often, identifying and tracking the location of wireless devices requires the establishment of a two-way communication session between the device being tracked (the "tracking device") and another device (such as a mobile phone, computer, or any other suitable device, "mobile device" hereinafter). As described herein, a tracking device can instead be identified using one-way communications (communications from the tracking device to the mobile device), without requiring communications from the mobile device to the tracking device. Such communications are referred to as "advertisements" by the tracking device, and can be secured by the tracking device to prevent interception by unauthorized entities, for instance entities masquerading as an associated mobile device or entities eavesdropping on tracking device advertisements to collect information about the tracking device.

A tracking device (such as the tracking device 106 of FIG. 1) can be configured to generate a hash value identifying the tracking device. The hash value can be dependent on one or more parameters associated with the tracking device, including but not limited to one or more of the following: a key stored by the tracking device, the MAC address of the tracking device (random or assigned to the tracking device by a tracking server, such as the tracking system 100 of FIG. 1), a device identifier (such as a persistent identifier that uniquely identifies the tracking device), a time at which the hash value is generated, or any other suitable parameters. By generating a hash value based on a time at which the hash value is generated, the hash value can expire after a threshold amount of time elapses, or after the passage of a pre-defined time interval, as described below.

In some embodiments, the generated hash value is represented by the function:

hash_value=f(tracking_device_key, tracking_device_identifier, time)

The tracking device can generate a hash value (or, in some embodiments, a keyed-hash value) using any suitable hashing function, such the SHA-X function, the MDX function, the RIPEMD function, the PANAMA function, the Tiger function, the WHIRLPOOL function, the Bernstein hash function, the Fowler-Noll-Vo hash function, the Jenkins hash function, the Pearson hash function, the Zobrist hash function, and the like. A keyed-hash message authentication code (HMAC) construction can be used for calculating the keyed-hash. Although hash functions are described herein, in other embodiments, the tracking device is configured to generate an encrypted or otherwise encoded value based on one or more device parameters using any suitable encryption or encoding function. The parameter "tracking_device_key" refers to a key stored by the tracking device, the parameter "tracking_device_identifier" refers to an identifier that uniquely identifies the tracking device, and the parameter "time" refers to the time interval or period during which the hash value is generated.

Figure 5:
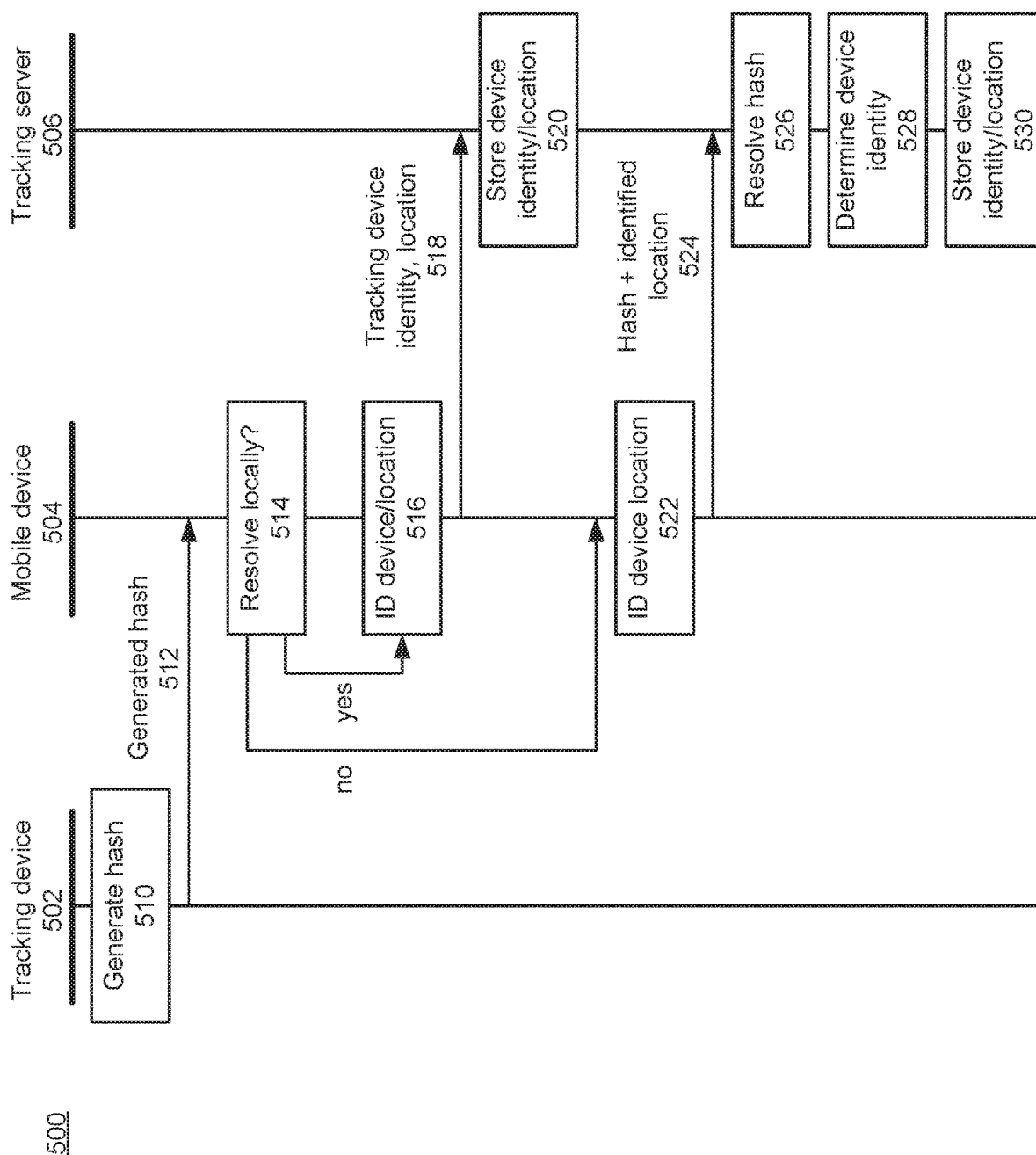
FIG. 5 illustrates a process of identifying a tracking device and an associated location, according to one embodiment.

FIG. 5 illustrates a process 500 of identifying a tracking device and an associated location, according to one embodiment. A tracking device 502 generates 510 a hash value based on one or more tracking device parameters, such as an assigned tracking device key, a persistent tracking device unique identifier, and a time or time interval during which the hash value is generated. The tracking device 502 can generate a new hash value periodically, after the passage of a pre-determined interval of time, in response to detected movement of the tracking device, or in response to any other suitable stimulus.

The generated hash value 512 is advertised or broadcasted, for instance using the Bluetooth protocol, and is received by the mobile device 504. In some embodiments, the tracking device 502 advertises the hash value periodically, a threshold number of times per generated hash value, in response to generating the hash value, or based on any other suitable criteria. It should be noted that the generated hash 512 can advertised independent of or without communications from the mobile device 504.

The mobile device 504 receives the hash value and determines 514 whether the hash value can be resolved locally. To resolve a hash value locally, the mobile device 504 accesses a set of stored parameters for each tracking device associated with or "owned by" the mobile device 504 (such as a tracking device key and/or tracking device identifier assigned to the mobile device by a tracking server 506), and generates a hash value for each owned tracking device using the same hash function and tracking device parameters as the tracking device 502. If the received hash value matches any hash value generated by the mobile device 504, the mobile device 504 identifies the tracking device 502 as the tracking device associated with the matched hash value, identifies the location of the tracking device 502, and provides the tracking device identity and location 518 to the tracking server 506. The tracking server 506 stores 520 the received tracking device identity in association with the received tracking device location.

If none of the hash values generated by the mobile device 504 match the received hash value, or if the mobile device 504 does not have access to device parameters for tracking devices owned by the mobile device 504, the mobile device 504 identifies 522 the location of the tracking device 502, and forwards the received hash value and the identified location 524 to the tracking server 506. The tracking server 506 resolves 526 the hash value by generating a hash value for each tracking device tracked by or associated with the tracking server 506 using associated device parameters maintained by the tracking server 506. The tracking server 506 identifies 528 the tracking device 502 by matching the received hash value to a hash value generated by the tracking server 506. Upon identifying the tracking device 502, the tracking server 506 stores 530 the received location in association with the identity of the tracking device 502.

The tracking server 506 can be configured to pre-generate hash values for each tracking device associated with the tracking server 506, and to store the pre-generated hash values in, for example, a hash table. For instance, for hash values generated using, as one tracking device parameter, the hour interval (such as 10:00 am-11:00 am PDT) during which the hash value is generated, the tracking server 506 can generate hash values for each tracking device associated with the tracking server 506 every hour. If a hash value generated in a previous hour interval is received at the tracking server 506, the tracking server 506 may not be able to resolve the hash value using hash values generated during a current hour interval. In such instances, the received hash value has "expired", and the tracking server 506 ignores the expired hash value, waits for a subsequent/non-expired hash value from the tracking device 502 (via the mobile device 504), and resolves the subsequent hash value. It should be noted that although examples are given with regards to hour intervals, hash values can be generated an expire with regards to any time interval, such as the 5-minute interval, the 15-minute interval, the 6-hour interval, the 24-hour interval, and the like.

In order to synchronize maintained times between the tracking device 502, the mobile device 504, and the tracking server 506, the tracking device 502 can authenticate the mobile device 504 and/or tracking server 506, and can synchronize a timing tracker at the tracking device 502 in response to the authentication. Alternatively, the tracking device 502 can synchronize a timing tracker at the tracking device 502 using an external entity, in response to the manual synchronization of the timing tracker by a user, or using any other suitable synchronization means. In some embodiments, the mobile device 504 can determine that a tracking device 502 is out of synch by resolving an expired hash value received from the tracking device and determining that the resolved hash value has expired. In response to determining that the tracking device 502 is out of synch, the mobile device 504 can trigger a re-synchronization by connecting to the tracking device and updating the tracking device's timing information. In some embodiments, re-synchronization occurs during a grace period, for instance a threshold period of time after new hash values associated with a time interval are generated.

The hash function used by the tracking device 502 can produce hash values of any suitable size or length. In some embodiments, the length of the hash value or the type of hash function is selected based on available power, time, or any other characteristic of the tracking device 502 or tracking server 506. In some embodiments, the length of the hash value is selected based on a pre-determined acceptable collision rate. Collisions occur when the tracking server 506 generates the same hash value for two or more tracking devices during a particular time interval. Collisions can be resolved by comparing a previous known/stored location for each tracking device associated with the collision and the received location associated with the received hash value. For instance, if a previous known/stored location for a particular tracking device associated with a collision is within a threshold distance of a received location, the tracking device 502 can identify the particular tracking device from among the tracking devices associated with the collision as the tracking device associated with the received location. In some embodiments, the tracking server 506 can simply ignore received hash values associated with collisions until a new hash value generated during a subsequent time interval is received, and can resolve the new hash value accordingly.

It should be noted that in some embodiments, the hash values described herein are included within a communication packet that also includes other types of data. For instance, a packet can include a hash value and one or more of: information describing a broadcast power by the tracking device 502, a time of communication, an identity of the mobile device 504 associated with the tracking device, an identity of a user associated with the tracking device, a digital signature for use in verifying the identity of the tracking device or the authenticity of the communication packet, or any other suitable information.

In some embodiments, the "time" variable in the hash function described above is an incremented time interval value. For example, the value of the time variable for the first 15 minute interval of a calendar year is "00001", the value of the time variable for the second 15 minute interval is "00002", and so forth. In order to align the value of the time variable used in computing the hash value, the tracking device 502 can include the value of the time variable in plaintext in a header of an advertisement packet that includes the hash value. In such embodiments, a mobile device 504 or tracking server 506 can parse the value of the time variable included within the header, and can compute hash values for tracking devices associated with the mobile device or tracking server using the parsed value of the time variable for comparison with the hash value included within the advertisement packet.

For collisions, in addition to using the geographic location of the tracking device to resolve collisions between hash values, the geographic location of or associated with a user can be used. For example, if a first hash value is associated with a first tracking device and a second hash value is associated with a second tracking device, a collision between the first hash value and the second hash value can be resolved by determining that the location of the mobile device from which each hash value was received is within a threshold distance of a geographic location associated with an owner of the first tracking device, and by selecting the first tracking device as associated with the received hash value.

Likewise, collisions between hash values can be resolved by using account information associated with tracking device users. For instance, if a user is associated with a user account that is in turn associated with a mobile device, and a hash value associated with a collision was received from the mobile device, a tracking device associated with the mobile device can be selected as associated with the hash value. Further, a hash value collision can be resolved based on a most recent incremented "time" variable value associated with each tracking device associated with the hash value collision. For instance, if a first hash value is associated with a first tracking device from which a hash value generated using the time value "00034" was recently received, if a second hash value is associated with a second tracking device from which a hash value generated using the time value "29531" was recently received, and if the hash values associated with the hash value collision are generated using the time values "00035" and "14224", the first tracking device can be selected as associated with the received hash value since "00034" is closer to "00035" than "29531" is to "00035" or "14224". In other words, a tracking device can be selected based on how proximal or close an incremented time or counter value associated with a collision is to a time or counter value recently used by a tracking device associated with the collision, without requiring the transmission of the incremented value itself.

In some embodiments, the tracking server 506 attempts to resolve collisions first using user account information as described above. In the event that the collision cannot be resolved using account information, the tracking server attempts to resolve the collision using proximity of incremented time or counter values recently used by a tracking device in generating a hash value to time or counter values used to generate hash values associated with a collision. In the event that the collision still cannot be resolved, the tracking server can then attempt to resolve the collision using a proximity of a geographic location of a mobile device, tracking device, or user to a tracking device associated with a collision.

Replay attacks, or the use of a hash value intercepted by an unauthorized entity to attempt to authenticate a tracking device, can be avoided by tracking incremented time or counter values associated with a tracking device. For instance, when a hash value is received from a tracking device, the tracking server 506 can update a stored time/counter value associated with the tracking device. When a subsequent hash value is received that is associated with a lower or earlier time/counter value, the tracking server can disregard the hash value and can deny a request to authenticate the tracking device.

In embodiments where each time or counter value used to generate a first hash value is associated with a particular time interval (e.g., 15 minutes), the tracking server can deny a request to authenticate a tracking device from which a subsequent hash value is received based on the same time or counter value if the subsequent hash value is received outside of the time interval (for instance, continuing with the previous example, if the subsequent hash value is received 20 minutes after the first hash value is received). The tracking server can increment tracked time or counter values for a tracking device based on an amount of time that has lapsed since a hash value associated with a tracked time or counter value was received. Thus, if a hash value is received from a tracking device that is generated using a time or counter value outside of an expected range for the tracking device (e.g., a time or counter value occurring before a tracked time or counter value for the tracking device, or occurring more than a threshold distance beyond from a tracked time or counter value incremented by the tracking server), the tracking server can disregard the received hash value and/or deny a request to authenticate a corresponding tracking device.

Motion-Activated Location Determination

To determine the location of a tracking device, such as the tracking device 106 of FIG. 1, the tracking device emits a location-request beacon or advertisement signal (location request). In response to receiving the beacon or advertisement signal, a mobile device, such as the mobile device 104 of FIG. 1, uses location-determining functionality (such as a GPS receiver) to determine the location of the mobile device. Being in close proximity with the tracking device, the location of the mobile device is associated with the tracking device. However, the use of location-determining functionality by the mobile device is often very power-consuming, resulting in the draining of the mobile device's battery or other power source.

To offset the drain of power by the location-determining functionality of the mobile device, the tracking device can be configured to emit a location request only in response to the detection of movement by the tracking device. When the tracking device is not moving, the location of the tracking device doesn't change, and a previous determined location (determined in response to the detection of a previous movement) is sufficient to describe the location of the tracking device.

In other embodiments, the tracking device is configured to emit a location request either in response to the detection of movement by the tracking device, at a fixed interval, or in response to a request from a mobile device. In such embodiments, the tracking device can include a time stamp within the location request indicating a time associated with the last detected movement of the tracking device. In response to receiving a location request from the tracking device by a mobile device, the mobile device can determine based on the time associated with the last detected movement of the tracking device if the tracking device has moved since the last time a high-accuracy location was determined for the tracking device. For instance, if a tracking device is within a threshold distance from the mobile device when the mobile device receives a location request, the mobile device can associate the tracking device with the location of the mobile device, and can determine that the associated location is a "high-accuracy" location.

If the mobile device subsequently moves more than the threshold distance away from the tracking device and receives a location request, and if the location request includes a timestamp indicating that the tracking device hasn't moved since the mobile device associated the tracking device with the location of the mobile device from within a threshold distance from the tracking device, then the mobile device can maintain the association between previous location and the tracking device as a high-accuracy location. On the other hand, if the location request includes a timestamp indicating that the tracking device has since moved, the mobile device can associate the location of the mobile device with the tracking device, though because the distance between the mobile device and tracking device is greater than the threshold distance, the associated location is maintained as a low-accuracy location. It should be noted that in some embodiments, the location request can include an indication of movement magnitude. In such embodiments, the mobile device can determine that a previous high-accuracy location is still a high-accuracy location if the magnitude of movement is below a movement threshold. Alternatively, if the movement is greater than the movement threshold, the mobile device can determine that the previous high-accuracy location is now a low-accuracy location, or can associate the new location of the mobile device with the tracking device as a low-accuracy location.

In some embodiments, the threshold distance described above is a distance such that the tracking device sends communications to the mobile device, but such that the mobile device cannot send communications to the tracking device (in other words, the tracking device is outside of the range of the mobile device). In some embodiments, the threshold distance is a pre-determined distance such that location information of the mobile device and associated with the tracking distance is above a threshold accuracy (a "high-accuracy" location) when the mobile device is within the threshold distance of the tracking device and is below a threshold accuracy (a "low accuracy" location) when the mobile device is outside the threshold distance from the tracking device. In some embodiments, the location request from the tracking device includes an indication of strength of transmission power. In such embodiments, the indicated strength of transmission power can be used to determine if the mobile device is within the threshold distance of the mobile device.

The tracking device can include one or more movement-detection mechanisms. For example, the tracking device can include a gyroscope, an accelerometer configured to detect movement along one or more axes, an acoustic motion sensor, a vibration sensor, a spring-based motion detector, or any other suitable mechanism. In some embodiments, the type of motion detection implemented within the tracking device can be basic, as the mere detection of motion in any form can be sufficient to trigger a location request. In such embodiments, rudimentary and/or low-power motion detectors can be implemented within the tracking device, beneficially reducing the cost of and/or power used by the tracking device.

Figure 6:
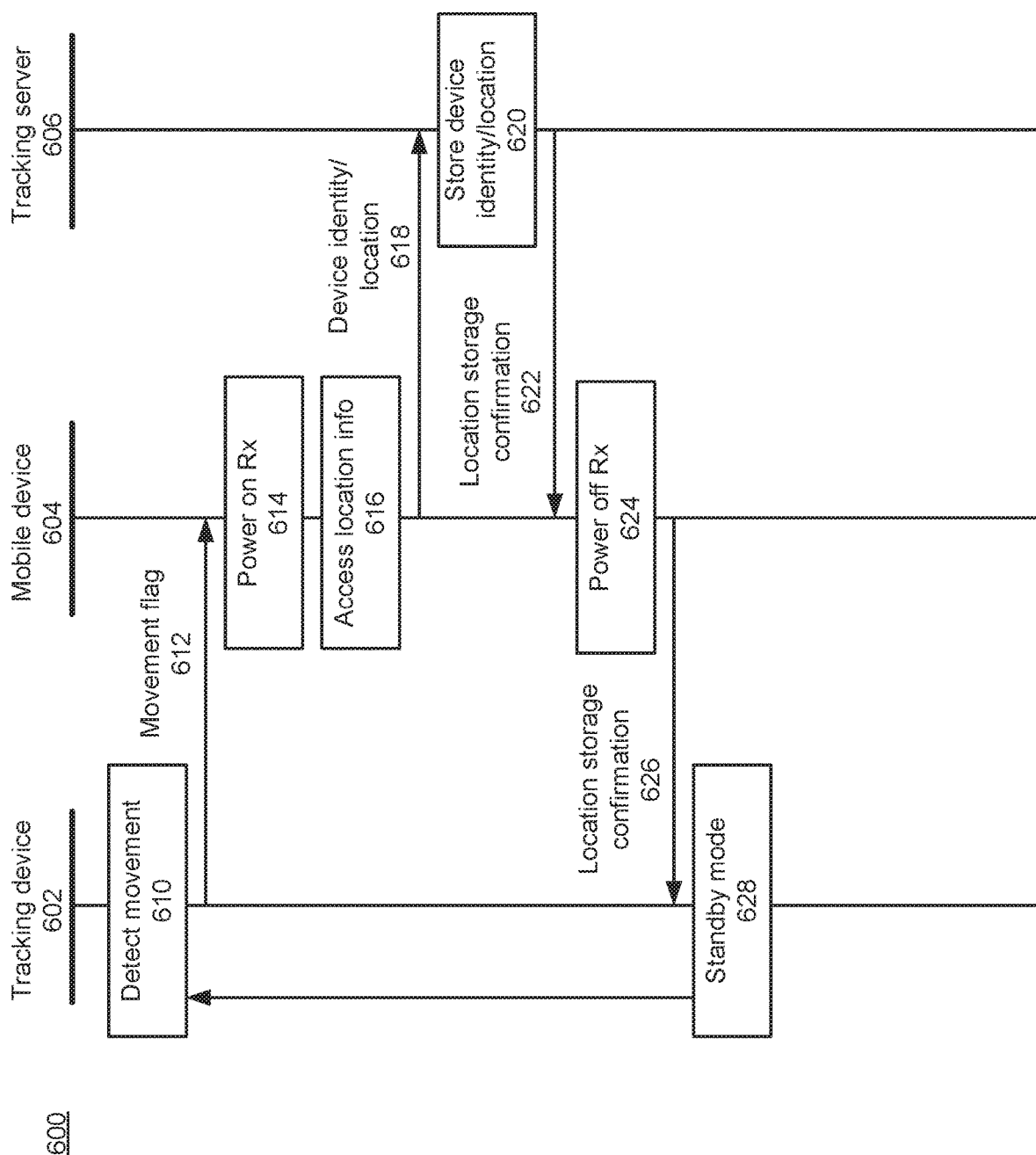
FIG. 6 illustrates a process of determining device location in response to movement detection, according to one embodiment.

FIG. 6 illustrates a process 600 of determining device location in response to movement detection, according to one embodiment. A tracking device 602 detects 610 movement using, for instance, one or more motion-detection devices within the tracking device 602. In response to detecting the movement, the tracking device 602 sends a movement flag 612 or other indication of the movement to a mobile device 604. In response to receiving the movement flag 612, the mobile device powers on 614 a location-detection receiver, such as a GPS receiver, and accesses location information associated with the location of the mobile device 604 (and, due to the proximity of the tracking device 602 to the mobile device 604), the location of the tracking device 602.

The mobile device 604 provides the identity and location 618 of the tracking device 602 to the tracking server 606. The tracking server stores 620 the received location in association with the identity of the tracking device 602, and provides a confirmation 622 of the storage of the received location to the mobile device 604. In response to receiving the storage confirmation 622, the mobile device 604 powers off the location-detection receiver. It should be noted that in embodiments where the mobile device 604 does not receive the confirmation 622 from the tracking server 606, the mobile device 604 can re-send the tracking device identity and location to the tracking server 606. In some embodiments, the mobile device 604 can power off the receiver immediately after providing the tracking device identity and location to the tracking server 606.

The mobile device 604 provides confirmation 626 of the storage of the tracking device location by the tracking server 606 to the tracking device 602. In response to receiving the confirmation 626, the tracking device 602 enters standby mode 628 until subsequent movement is detected. In embodiments where the tracking device 602 does not receive the confirmation 626, the tracking device 602 can re-send the movement flag 612 to the mobile device 604. In some embodiments, the mobile device 604 provides confirmation of providing the tracking device identity and location to the tracking server 606 to the tracking device 602 without waiting to receive the confirmation 622 that the location was stored from the tracking server 606, and in response, the tracking device 602 can enter the standby mode 628. By only powering on the location-detection receiver in response to the detection of movement by the tracking device 602, the mobile device 604 saves power that would otherwise be required to power on the location-detection receiver during periods of time when the tracking device 602 is not moving.

Figure 7:
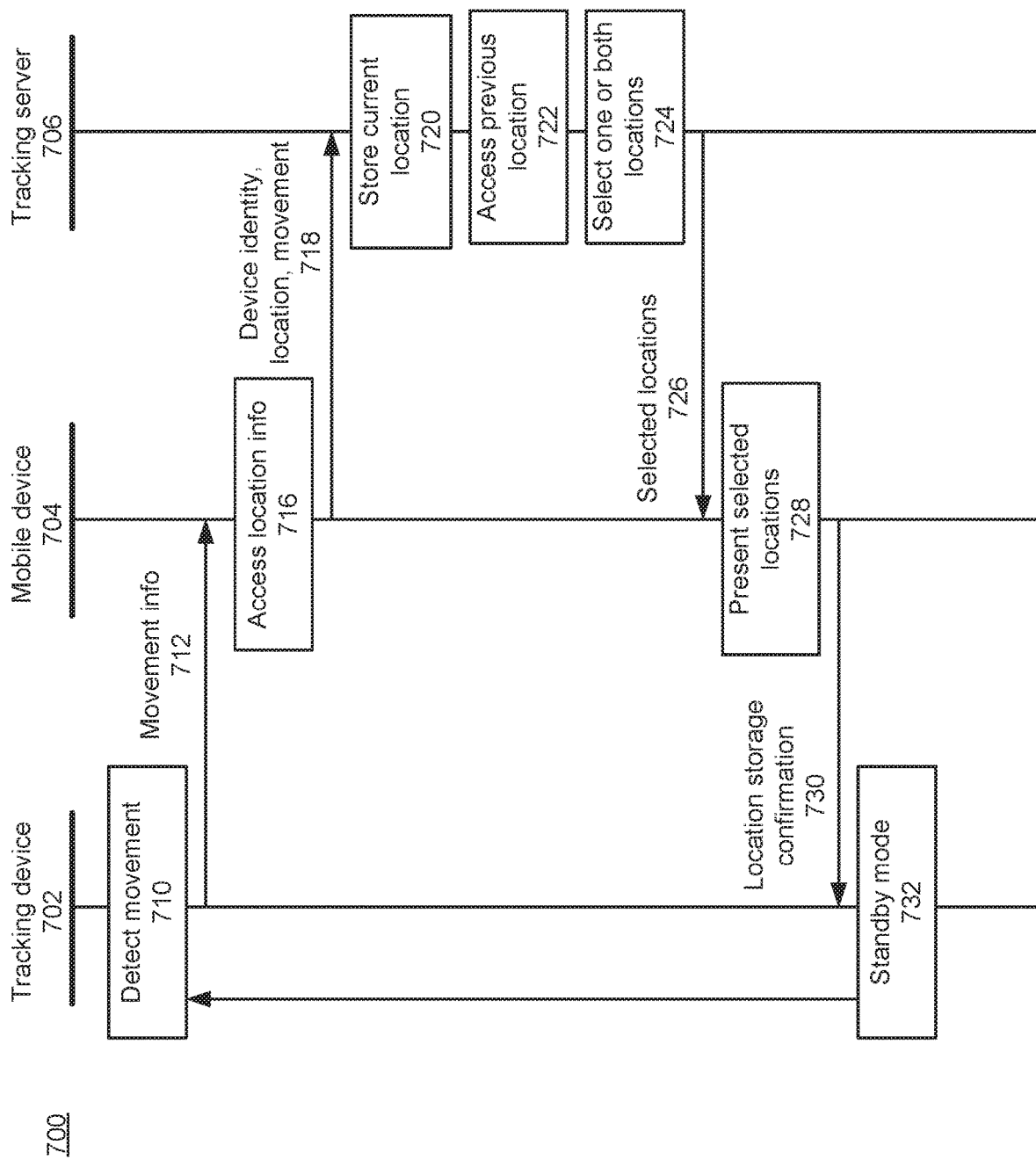
FIG. 7 illustrates a process of selecting between current or previous device location information, according to one embodiment.

FIG. 7 illustrates a process 700 of selecting between current or previous device location information, according to one embodiment. The tracking device 702 detects 710 movement, for instance using one or more location-detection devices as described above. In response, the tracking device 702 provides movement information 712 to the mobile device 704. The movement information 712 can include, for instance, a magnitude of detected movement.

In response to receiving the movement information 712, the mobile device 704 accesses location information 716, for instance using location-detection mechanisms, as described above. Although not illustrated in FIG. 7, the mobile device 704 can implement the power-saving process of FIG. 6 by powering on the location-detection mechanisms of the mobile device 704 only in response to receiving the movement information 712.

The mobile device 704 provides the identity, location, and movement information 718 of the tracking device 702 to the tracking server 706. The tracking server 706 stores 720 the received location in association with the tracking device 702 as the current location of the tracking device. The tracking server 706 accesses 722 a previous location associated with the tracking device 702 stored by the tracking server 706.

The tracking server 706 then selects one or both of the current location and the previous location of the tracking device 702 for providing to the mobile device 704. In some embodiments, the tracking server 706 can select the location of the tracking device 702 determined to be the most accurate. For instance, if the received movement information indicates that the detected movement of the tracking device 702 is very small and/or that the accuracy of the received current location is low (for instance, as a result of the tracking device 702 being determined to be more than a first threshold distance from the mobile device 704), the tracking server 706 can determine that the previous location is more accurate than the current location, and can select the previous location.

Alternatively, if the accessed previous location was received and stored more than a threshold amount of time ago and/or the accuracy of the received current location is high (for instance, as a result of the tracking device 702 being determined to be less than a second threshold distance from the mobile device 704), the tracking server 706 can determine that the current location is more accurate than the previous location. In some embodiments, the tracking server 706 can determine that the current location and the previous location are equally or within a threshold measurement of accuracy to each other and can select both locations. In some embodiments, when the tracking server 706 determines that the current location is more accurate or reliable than the previous location, the tracking server 706 overrides the previous location with the current location in association with the identity of the tracking device 702.

The tracking server 706 provides the one or more select locations 726 to the mobile device 704. In response, the mobile device 704 presents 728 the one or more selected locations, for instance to a user of the mobile device 704. Alternatively, the mobile device 704 can store the one or more selected locations for subsequent access. The mobile device 704 can then provide confirmation 730 to the tracking device 702 that the current location was received and/or stored by the tracking server 706. In response, the tracking device 702 can enter standby mode 732 until subsequent motion of the tracking device 702 is detected.

End-to-End Encryption in a Tracking Device Environment

In order to facilitate data privacy within the tracking device environment, data protection measures can be implemented by a central tracking system (e.g., tracking system 100, or "tracking server" herein). As described herein, a permanent encryption key pair associated with a tracking device can be used to encrypt the temporary private keys of one or more temporary encryption key pairs associated with the tracking device, and the central tracking system can store the temporary public keys and the encrypted temporary private keys. Community mobile devices that detect the tracking device can encrypt location data using the temporary public keys, and the central tracking system can provide the encrypted location data to an owner of the tracking device for decryption.

Such data protection measures enable location data to be protected at the moment it is gathered (by community mobile devices), as it is provided to and stored by the central tracking system, and as it is provided to an owner of the tracking device. In such an implementation, only an owner of the tracking device (or an individual with whom the tracking device has been shared) is able to decrypt the encrypted temporary private keys, which in turn are used to decrypt the location data. Accordingly, an entity associated with the central tracking system (such as a database manager) is unable to decrypt the location data, beneficially protecting the location data from the moment it is gathered by a community mobile device until it is received by an owner of the tracking device.

As noted above, a tracking device associated with an identifier can use a set hash keys to hash the identifier, and can include the hashed identifier in an advertising packet that is transmitted periodically. These hash keys can be rotated such that, for instance, a new hash key can be used every 15 minutes. The hash keys can be generated in advance, for instance, by a manufacturer of the tracking device, by a tracking server associated with the tracking device, by a device associated with the tracking device (such as a mobile device of an owner of the tracking device), or by the tracking device itself. The hash keys can also be generated on-demand, for instance based on a current time interval within which the tracking device identifier is to be hashed. In some embodiments, the hash keys are generated using a hash key algorithm. In such embodiments, the tracking device (or a device associated with the tracking device) and the central tracking system can each independently generate the same set of hash keys using a hash key algorithm, beneficially enabling the central tracking system to store and associate the set of hash keys with the tracking device without requiring the transmission of the set of hash keys between the tracking device (or the device associated with the tracking device) and the central tracking system.

A permanent encryption key pair (including a permanent public key and a permanent private key) is generated for the tracking device. The permanent encryption key pair can be generated during the manufacture of the tracking device, upon activation of the tracking device, upon registration of the tracking device with a central tracking system, or at any other suitable time. The permanent encryption key pair can be generated by the manufacturer, by an owner device associated with the tracking device, by the central tracking system, or by any other suitable entity. The owner device (such as a mobile device associated with an owner of the tracking device and configured to communicate with the tracking device) can store the permanent public key and the permanent private key. The owner device can provide the permanent public key to the central tracking system for storage in association with an identifier of the tracking device. Although the permanent public key is transmitted to the central tracking system, the permanent public key can be kept confidential, since the permanent public key may otherwise be used to uniquely identify the tracking device.

A set of temporary encryption key pairs are generated for the tracking devices. Each temporary encryption key pair includes a temporary private key and a temporary public key. The temporary encryption key pairs can be generated using any suitable encryption key generation method, for instance the Rivest-Shamir-Adleman ("RSA") algorithm or an elliptic-curve cryptography ("ECC") algorithm. The set of temporary encryption key pairs can include one encryption key pair or any number of encryption key pairs. In some embodiments, one encryption key pair is generated for each hash key in the set of hash keys used by the tracking device. The set of temporary encryption key pairs can be generated upon activation of a tracking device, for instance by an owner mobile device used to activate the tracking device. Alternatively, the set of temporary encryption key pairs can be generated periodically or in response to an event (such as a request from an owner of the tracking device, a complete rotation through a previous set of temporary encryption key pairs, and the like).

In some embodiments, the set of temporary encryption key pairs can be generated by an owner mobile device or by another device of the owner, while in other embodiments, the set of temporary encryption key pairs can be generated by the central tracking system, by the tracking device, by a manufacturer of the tracking device, or by any other suitable entity. The temporary private key of each temporary encryption key pair associated with a tracking device can be encrypted (for instance, by an owner mobile device, by the tracking device, by the central tracking system, or by any other entity) using the permanent public key associated with the tracking device. Each encrypted temporary encryption key pair (including the encrypted temporary private key and the associated temporary public key) is then provided to the central tracking system for distribution to mobile devices that subsequently detect the tracking device as described below.

Figure 8:
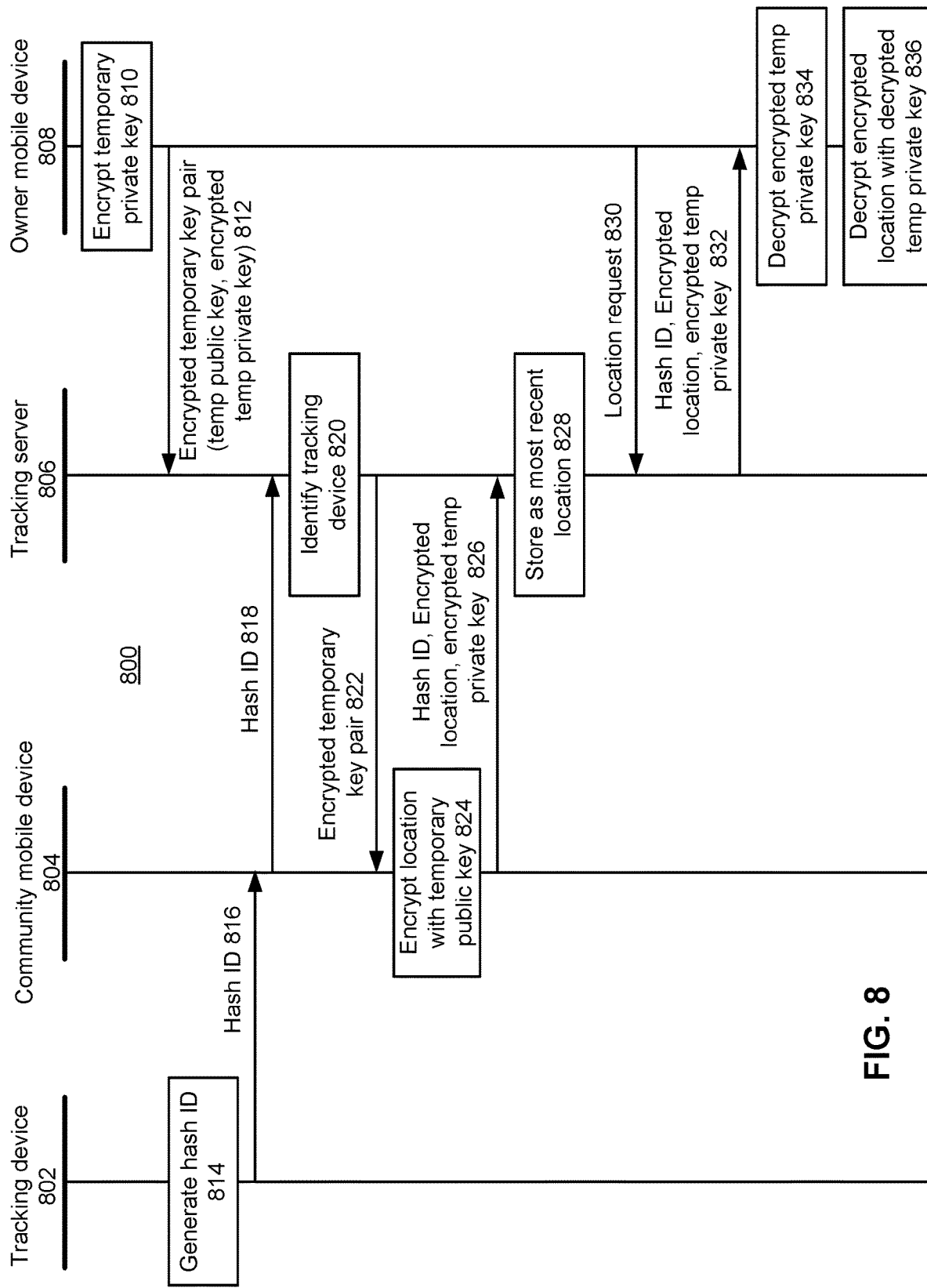
FIG. 8 is an interaction diagram illustrating a process for implementing end-to-end encryption in a tracking device environment, according to one embodiment.

FIG. 8 is an interaction diagram illustrating a process for implementing end-to-end encryption in a tracking device environment, according to one embodiment. The environment 800 of FIG. 8 includes a tracking device 802, a community mobile device 804, a tracking server 806, and an owner mobile device 808. In the embodiment of FIG. 8, the owner mobile device 808 encrypts 810 the temporary private key of each temporary encryption key pair associated with the tracking device 802 using the permanent public key associated with the tracking device 802 (which the owner mobile device 808 can access). As noted above, in some embodiments, the owner mobile device 808 generates the set of temporary encryption key pairs in advance, for instance generating one temporary encryption key pair for each hash key associated with the tracking device 802. The owner mobile device 808 then provides 812 the encrypted temporary key pairs (each including a temporary public key and the corresponding encrypted temporary private key) to the tracking server 806 for storage.

After the tracking server 806 stores the encrypted temporary key pairs, the tracking device 802 generates 814 a hashed identifier ("hash ID") for inclusion in periodic advertisement beacon transmissions. The hash key used to hash the unique identifier of the tracking device 802 can be selected based on a current time interval during which the hashed identifier is generated. For instance, each 15-minute interval within a year can be associated with a different hash key of a set of hash keys. The community mobile device 804 receives 816 the hashed identifier from the tracking device 802, for instance after moving within a threshold proximity of the tracking device and receiving an advertisement beacon transmission from the tracking device. The community mobile device 804 provides 818 the hashed identifier to the tracking server 806.

The tracking server 806 identifies 820 the tracking device 802 by identifying the hash key used to generate the hashed identifier, and identifying the tracking device associated with the identified hash key. The tracking server 806, upon identifying the tracking device 802, identifies an encrypted temporary encryption key pair. In embodiments in which there is a 1-to-1 relationship between the set of hash keys and encrypted temporary encryption key pairs, the identified encrypted temporary encryption key pair comprises the encrypted temporary encryption key pair associated with the hash key used to generate the hashed identifier. The tracking server 806 then provides 822 the identified encrypted temporary encryption key pair to the community mobile device 804.

The community mobile device 804 determines a location of the community mobile device, for instance by activating a GPS receiver and determining a set of GPS coordinates representative of the location of the community mobile device. Upon receiving the encrypted temporary encryption key pair, the community mobile device 804 encrypts 824 data representative of the determined location of the community mobile device using the temporary public key of the received encrypted temporary encryption key pair. The community mobile device 804 then provides 826 the hashed identifier, the encrypted location, and the encrypted temporary private key to the central tracking system. The central tracking system stores 828 the received hash identifier, the encrypted location data, and the encrypted temporary private key 868, for instance within a "last known location" field associated with the tracking device.

At a later time, the owner mobile device 808 requests 830 a current, most recent, or last known location of the tracking device 802. In response to receiving the request, the tracking server 806 accesses 832 the hashed identifier, the encrypted location data, and the encrypted temporary private key and provides this information to the owner mobile device 808. The owner mobile device decrypts 834 the encrypted temporary private key using the permanent private key (to which the owner mobile device has access), and then decrypts 836 the encrypted location data using the decrypted temporary private key. The decrypted location data can be displayed by the owner mobile device 808, for instance within a map interface.

Figure 9:
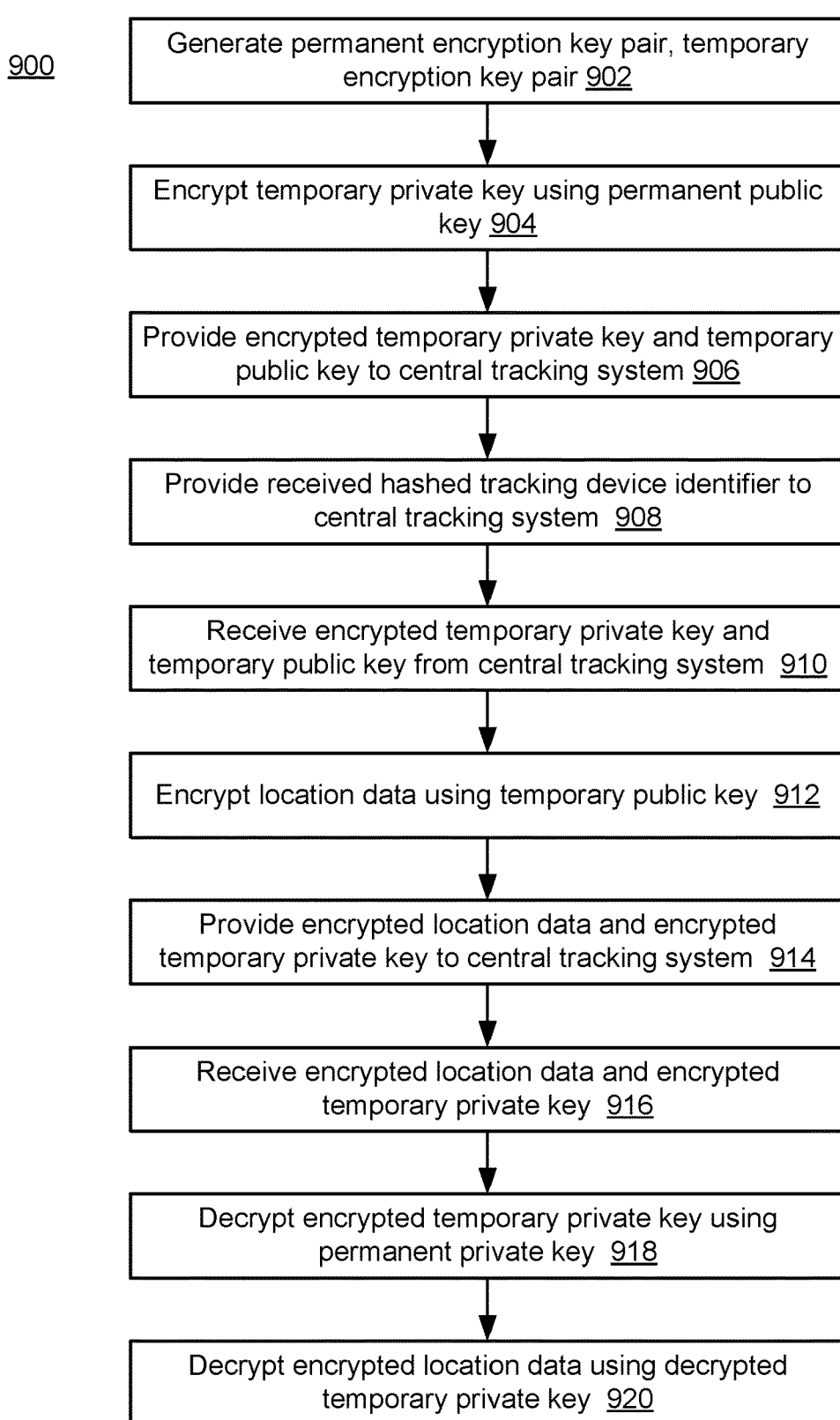
FIG. 9 illustrates a process for implementing end-to-end encryption in a tracking device environment, according to one embodiment.

FIG. 9 illustrates a process for implementing end-to-end encryption in a tracking device environment, according to one embodiment. A permanent encryption key pair and a temporary encryption key pair associated with a tracking device are generated 902. The permanent encryption key pair includes a permanent public key and a permanent private key. Likewise, the temporary encryption key pair includes a temporary public key and a temporary private key. In some embodiments, a set of temporary encryption key pairs are generated, for instance one for each rotatable hash key associated with a tracking device.

The temporary private key of each temporary encryption key pair is encrypted 904 using the permanent public key. Each encrypted temporary encryption key pair (including a temporary public key and a corresponding encrypted temporary private key) is provided 906 to a central tracking system. The central tracking system stores each encrypted temporary encryption key pair in association with an identifier of the associated tracking device. For instance, if the central tracking system receives five sets of encrypted temporary encryption key pairs each associated with a different tracking device of five tracking devices, the central tracking system can store each set of encrypted temporary encryption key pairs in association with an identifier of the tracking device associated with the set of encrypted temporary encryption key pairs.

When a community mobile device (such as a mobile device not otherwise associated with the tracking device) receives a hashed tracking device identifier from the tracking device, the community mobile device provides 908 the received hash tracking device identifier to the central tracking system. The central tracking system then identifies the tracking device associated with the received hashed tracking device identifier (for instance, by hashing each of a set of tracking device identifiers with each of a corresponding set of hash keys). In response to identifying the tracking device associated with the received hashed tracking device identifier, the central tracking system provides and the community mobile device receives 910 an encrypted temporary encryption key pair associated with the identified tracking device.

The community mobile device then determines a location of the community mobile device (for instance, by activating the GPS receiver of the community mobile device), and encrypts 912 location data representative of the determined location using the temporary public key of the received encrypted temporary encryption key pair. The community mobile device then provides 914 the encrypted location data and the encrypted temporary private key of the received encrypted temporary encryption key pair to the central tracking system, which stores the encrypted location data and the encrypted temporary private key in association with an identity of the tracking device. In some embodiments, the community mobile device resends the hashed tracking device identifier with the encrypted location data and the encrypted temporary private key to the central tracking system, and the central tracking system determines the identity of the tracking device using the hashed tracking device identifier as described above.

When a user requests a location of the tracking device from the central tracking system, a user device with access to the permanent private key receives 916 the encrypted location data and the encrypted temporary private key from the central tracking system. The user device decrypts 918 the encrypted temporary private key using the permanent private key, and then decrypts 920 the encrypted location data using the decrypted temporary private key. The user device can then perform an action based on the decrypted location data, such as displaying the decrypted location data, for instance within a map interface or an operating system notification.

In some embodiments, instead of generating temporary encryption key pairs (as described above), a temporary private key can be used to generate a set of one or more diversified temporary public keys. Data encrypted using any of the set of diversified temporary public keys can be decrypted using the temporary private key. Any suitable key diversification operation can be used to generate the set of diversified temporary public keys. For instance, the set of diversified temporary public keys can be generated using Elgamal encryption, Elliptic Curve Integrated Encryption Scheme (ECIES) encryption, Networking and Cryptography library (NaCl) encryption, or any other suitable key diversification algorithm. In some embodiments, the set of diversified temporary public keys are generated based on the temporary private key, and can be generated using on one or more additional secrets (such as a set of elliptical curves, a secret value unique to the tracking device or an account of an owner of the tracking device, one or more passwords or passcodes, or any other suitable information).

Figure 10:
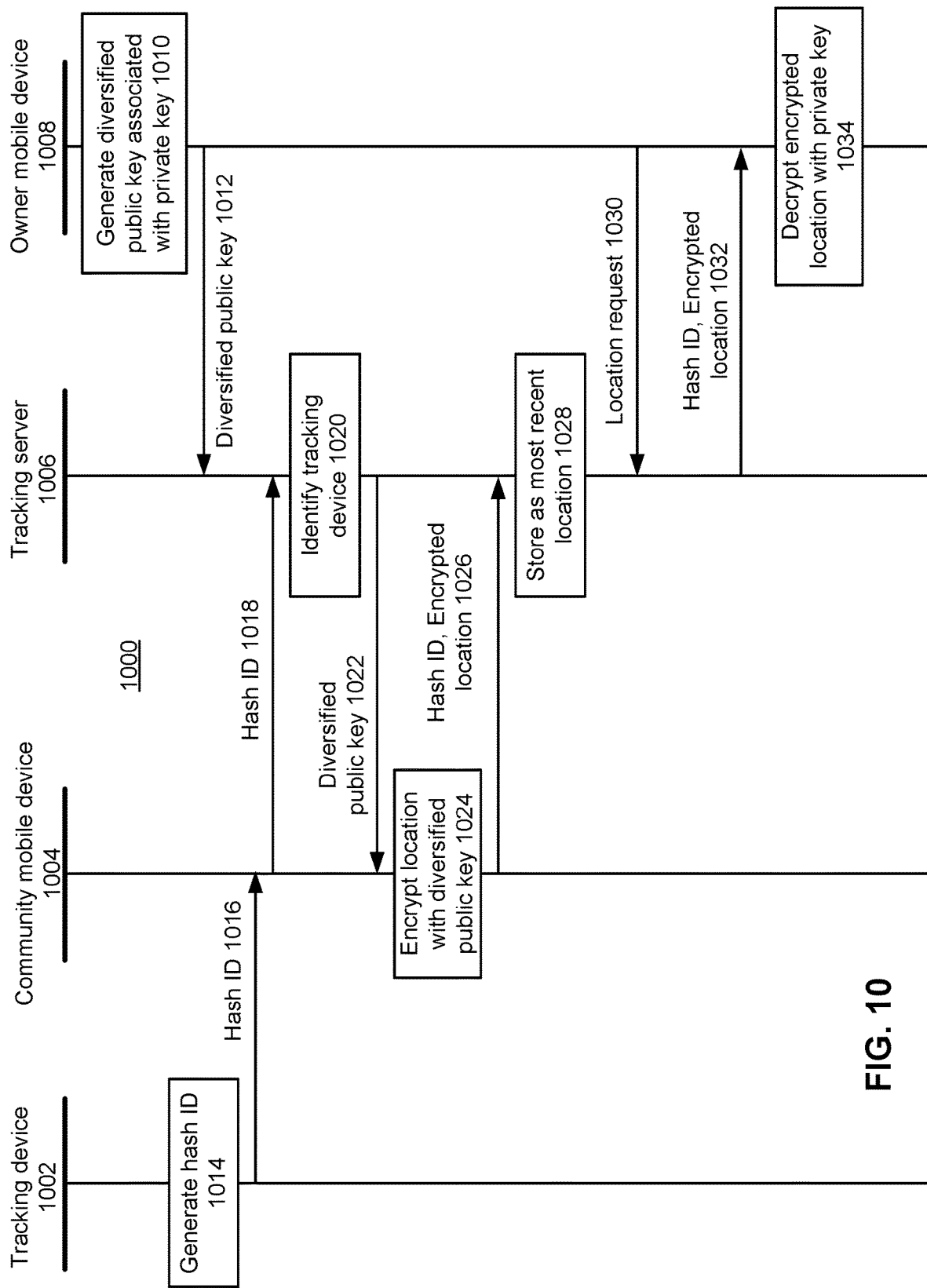
FIG. 10 is an interaction diagram illustrating a process for implementing end-to-end encryption in a tracking device environment using key diversification, according to one embodiment.

FIG. 10 is an interaction diagram illustrating a process for implementing end-to-end encryption in a tracking device environment using key diversification, according to one embodiment. In the embodiment of FIG. 10, an owner mobile device 1008 generates 1010 a diversified public key associated with a private key and provides 1012 the diversified public key to a tracking server 1006. In other embodiments, a set of diversified public keys are generated and provided to the tracking server 1006, and may be generated by an entity other than the owner mobile device 1008 (for instance, by the tracking server 1006 itself, by a key server, by a manufacturer of the tracking device 1002, or by any other suitable entity). In some embodiments, the diversified public keys are provided to a key server (not shown in the embodiment of FIG. 10) instead of the tracking server 1006. The key server can be associated with a different entity or company than the tracking server 1006, for instance a mobile phone service operator, a mobile device manufacturer, and the like.

As described above, the tracking server 1006 (or a key server) can associate each diversified public key in the set of diversified public keys with a different hash key of a set of hash keys associated with the tracking device 1002. In other embodiments, the set of diversified public keys are unique to the tracking device 1002, and can be used to identify the tracking device (or can be used by the tracking device to generate a hashed identified) in place of the set of hash keys.

In such embodiments, a community mobile device can receive the diversified public key directly from the tracking device 1002, or can forward the hashed identifier hashed using the diversified public key to the tracking server 1006 or a key server, and can receive the diversified public key from the tracking server or key server, respectively, in response.

The tracking device 1002 generates 1014 a hashed identifier ("hash ID") for inclusion in periodic advertisement beacon transmissions. The hash key used to hash the unique identifier of the tracking device 1002 can be selected based on a current time interval during which the hashed identifier is generated. For instance, each 15-minute interval within a year can be associated with a different hash key of a set of hash keys. The community mobile device 1004 receives 1016 the hashed identifier from the tracking device 1002, for instance after moving within a threshold proximity of the tracking device and receiving an advertisement beacon transmission from the tracking device. The community mobile device 1004 provides 1018 the hashed identifier to the tracking server 1006.

As described above, the tracking server 1006 identifies 1020 the tracking device 1002 by identifying the hash key used to generate the hashed identifier, and identifying the tracking device associated with the identified hash key. The tracking server 1006, upon identifying the tracking device 1002, identifies a diversified public key from the set of diversified public keys. In embodiments in which there is a 1-to-1 relationship between the set of hash keys and the set of diversified public keys, the identified diversified public key comprises the diversified public key associated with the hash key used to generate the hashed identifier. The tracking server 1006 then provides 1022 the identified diversified public key to the community mobile device 1004.

The community mobile device 1004 determines a location of the community mobile device, for instance by activating a GPS receiver and determining a set of GPS coordinates representative of the location of the community mobile device. Upon receiving the diversified public key, the community mobile device 1004 encrypts 1024 data representative of the determined location of the community mobile device using the diversified public key. The community mobile device 1004 then provides 1026 the hashed identifier and the encrypted location to the central tracking system 1006. The central tracking system 1006 stores 1028 the received hash identifier and the encrypted location data, for instance within a "last known location" field associated with the tracking device.

At a later time, the owner mobile device 1008 requests 1030 a current, most recent, previous, or last known location of the tracking device 1002. In response to receiving the request, the tracking server 1006 provides 1032 the hashed identifier and the encrypted location data to the owner mobile device 1008. The owner mobile device decrypts 1034 the location data using the private key associated with the set of diversified public keys. The decrypted location data can be displayed by the owner mobile device 1008, for instance within a map interface.

Although not illustrated in the embodiment of FIG. 10, it should be noted that similarly to the embodiment of FIG. 8, the private key can be encrypted using a permanent public key associated with the owner mobile device 1008, an account associated with the owner mobile device, the tracking device 1002, and the like. The encrypted private key can be provided to the tracking server 1006 for storage, and the tracking server 1006 can provide the encrypted private key to the owner mobile device 1008 with the hashed identifier and the encrypted location data. The owner mobile device 1008 can then decrypt the encrypted private key using a permanent private key corresponding to the permanent public key, and the decrypt the location data using the decrypted private key. It should also be noted that in some embodiments, the tracking device can protect the tracking device identifier using a data protection operation other than hashing, for instance by performing an encryption operation, a tokenization operation, or the like.

Figure 11:
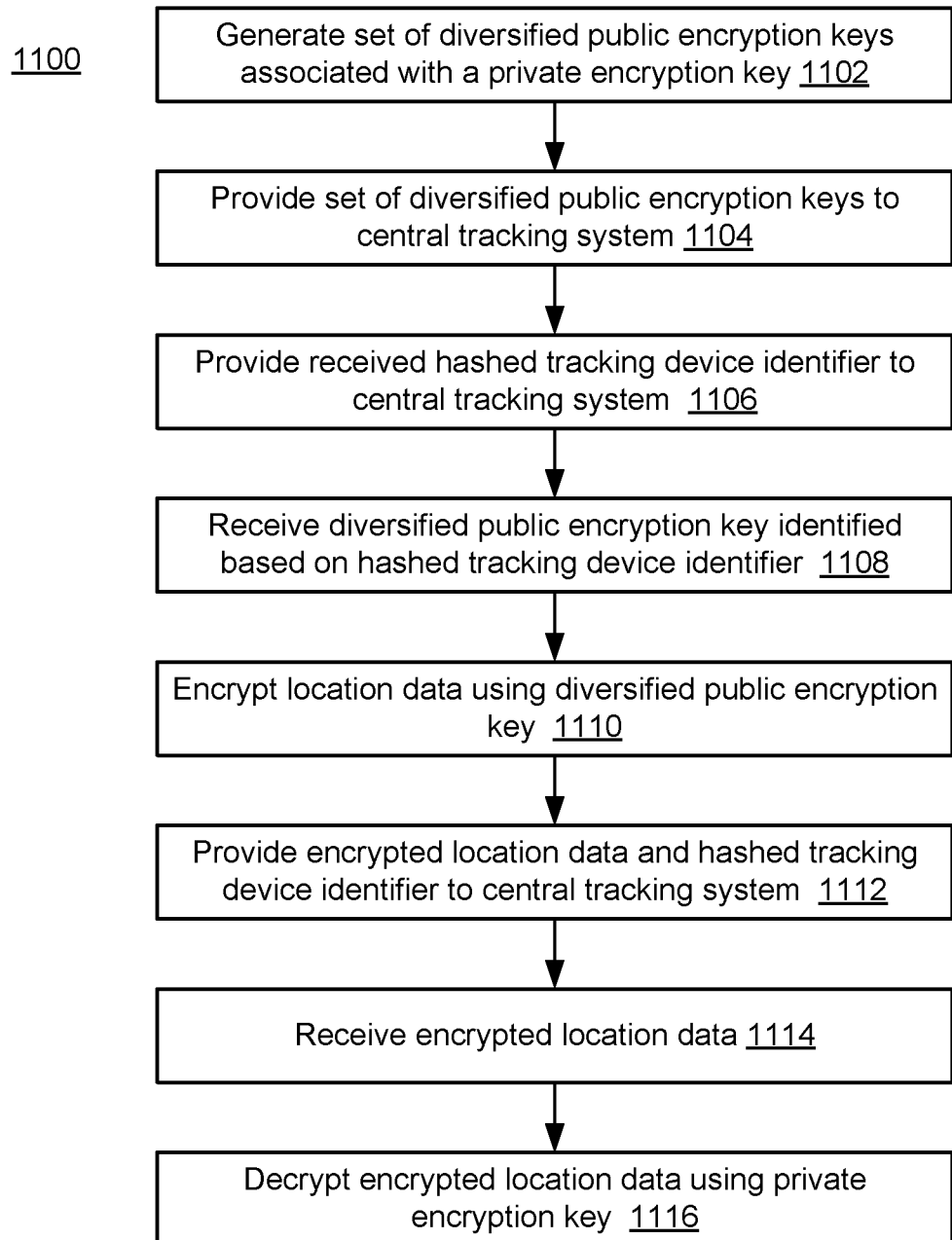
FIG. 11 illustrates a process for implementing end-to-end encryption in a tracking device environment using key diversification, according to one embodiment.

FIG. 11 illustrates a process for implementing end-to-end encryption in a tracking device environment using key diversification, according to one embodiment. A set of diversified public encryption keys associated with a private encryption key is generated 1102, for instance using Elgamal encryption, ECIES encryption, NaCl encryption, or any other suitable key diversification operation. The set of diversified public encryption keys is provided 1104 to a central tracking system. As noted above, the set of diversified public encryption keys may instead be provided to a key server.

A community mobile device provides 1106 a received hashed tracking device identifier to the central tracking system (or to a key server, in the event that the key server is storing the set of diversified public encryption keys). The community mobile device receives 1108 a diversified public encryption key from the central tracking system (or key server). The received diversified public encryption key can be selected based on the hashed identifier, the hash key used to generate the hashed identifier, a current time, or randomly. The community mobile device accesses location data representative of a location of the community mobile device and encrypts 1110 the location data using the diversified public encryption key. The encrypted location data is then provided 1112 to the central tracking system for storage.

At a later time, an owner of the tracking device can request and receive 1114 the encrypted location data from the central tracking system via an owner device. The owner device can decrypt 1116 the encrypted location data using the private encryption key corresponding to the set of diversified public encryption keys, and can display the location data to a user, for instance within a map interface. In some embodiments, the private encryption key can decrypt the encrypted location data despite which of the set of diversified public encryption keys is used to encrypt the location data.

Distributed Key Management in a Tracking Device Environment

In some embodiments, a number of different tracking functionality entities can allow their devices with tracking functionality to interoperate within a common tracking device ecosystem. In such embodiments, the public keys provided to a mobile device that has detected a tracking device for use in encrypting location data can be managed by the entity associated with the tracking device. For instance, devices with tracking device functionality can be manufactured, produced, or sold by multiple different entities. In such embodiments, the devices associated with each entity can have different interfaces, applications, security policies, authentication requirements, and the like. Despite these differences, the devices (and particularly, the tracking device functionality of the devices) can all operate within the same tracking device environment.

For instance, a detecting device (e.g., a mobile device, access point, and the like) operating within the tracking device environment can, in response to detecting a device with tracking device functionality (also referred to herein simply as a "tracking device"), forward a location of the detecting device to a central tracking server, regardless of the manufacturer or other entity associated with either the tracking device or the detecting device. In such embodiments, a detecting device associated with a first tracking entity can detect a tracking device associated with a second tracking entity and can provide a location of the detecting device in conjunction with an identity of the tracking device to the first tracking entity.

The tracking entities (or simply "entities") can be independent of each other. For instance, each entity can be a different, independent company that does not share location data, encryption keys, tracking device identities, or other personal information associated with tracking device users with any other entity. However, each of the plurality of entities can operate within the same tracking device environment described herein by implementing one or more common security and communication protocols. In particular, when a detecting device detects a tracking device, the detecting device can request a public key from an entity associated with the tracking device, can encrypt location data representing a location of the detecting device using the public key, and can provide the encrypted location to the entity associated with the tracking device as described below.

Figure 12:
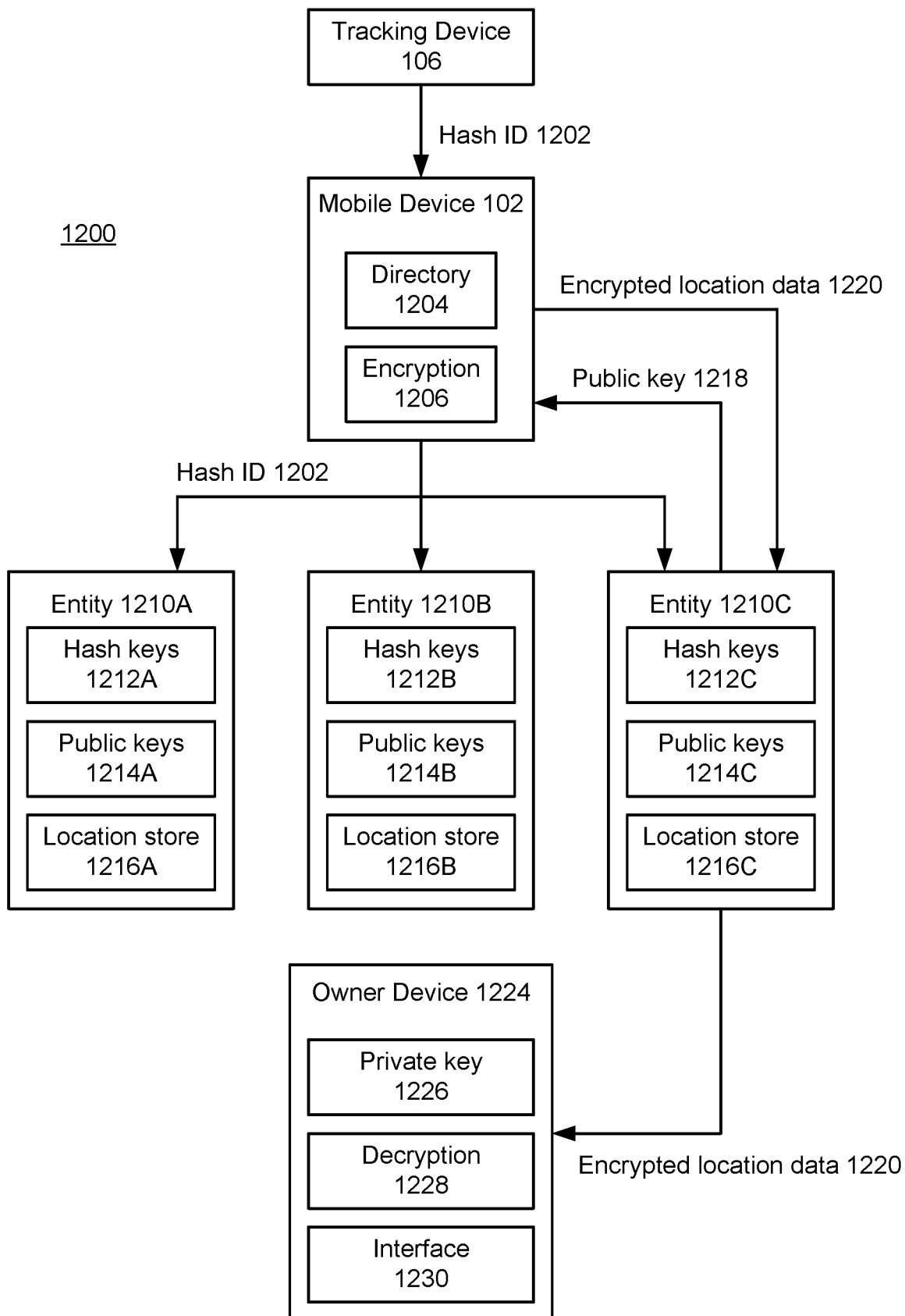
FIG. 12 is a system diagram illustrating distributed key management data flow in a tracking device environment, according to one embodiment.

FIG. 12 is a system diagram illustrating distributed key management data flow in a tracking device environment, according to one embodiment. The environment 1200 includes a tracking device 106, a detecting device (mobile device 102), a plurality of entities (entity 1210A, entity 1210B, and entity 1210C), and an owner device 1224. In the embodiment of FIG. 12, the tracking device 106 is associated with the entity 1210C (e.g., the entity 1210C is a manufacturer of the tracking device 106, a firmware provider for the firmware within the tracking device 106 that enables tracking device functionality, a software provider that distributes the operating system or an application associated with the tracking device 106, or the like).

In the environment 1200, the tracking device 106 transmits a hashed identifier 1202 generated by hashing an identifier that uniquely identifies the tracking device using a hash key stored or generated by the tracking device. Each entity 1210 is associated with a set of hash keys distributed to or associated with tracking devices associated with the entity, and in the embodiment of FIG. 12, the entity 1210C is associated with the set of hash keys that includes the hash key used to generate the hashed identifier.

The mobile device 102 detects the hashed identifier 1202 transmitted by the tracking device, for instance by being within a threshold proximity of the tracking device. The mobile device 102 includes a directory 1204 of the entities 1210 and an encryption engine 1206. The directory 1204 includes an identifier for each entity 1210, for instance a URL or other link, one or more APIs, an alphanumeric identity, or any other identifier that enables the mobile device 102 to communicate with the entity. The directory 1204 may be stored by the mobile device 102, or may be stored by an external system and accessed by the mobile device. In some embodiments, each entity 1210 provides the identifier to the entity that stores or manages the directory.

The mobile device 102 identifies the entities 1210 using the directory 1204, and queries each entity 1210 with the hashed identifier 1202, for instance using the link or API associated with each entity 1201 stored by the directory. As used herein, "querying" an entity 1210 can refer to querying a system (such as a server) associated with the entity 1210. Each entity 1210 includes a set of hash keys 1212 associated with the entity, a set of public keys 1214 associated with the entity, and a location store 1216. In some embodiments, each entity 1210 can compute a set of hashed identifiers, computed for instance by hashing an identifier of each tracking device associated with the entity with each hash key of the set of hash keys 1212 associated with the tracking device. In other embodiments, instead of storing the set of hash keys 1212, an entity can store the set of hashed identifiers for each tracking device associated with the entity and for each hash key associated with the tracking device.

The set of public keys 1214 stored by an entity 1210 can include a set of public keys associated with each tracking device associated with the entity. In some embodiments, each public key in the set of public keys associated with each tracking device are associated with a distinct private key. In other embodiments, the set of public keys comprise a set of diversified public keys associated with a single private key. The private key or keys associated with a set of public keys associated with a tracking device can be stored within an account or by a device associated with an owner of the tracking device. The location store 1216 stores location data associated with each tracking device associated with the entity 1210. In some embodiments, the location data associated with a tracking device stored within the location store 1216 comprises encrypted location data received from a mobile device that detects the tracking device (e.g., receives a hashed identifier transmitted by the tracking device). The location data associated with a tracking device stored within the location store 1216 can include all location data received in association with a tracking device, location data representative of one or more most recent locations of the tracking device, all location data received in association with the tracking device over a previous interval of time, and the like.

In response to being queried with the hashed identifier 1202, each entity 1210 responds to the mobile device 102 indicating that the hashed identifier either is associated with the entity or is not associated with the entity. In some embodiments the hashed identifier 1202 is not associated with an entity 1210 when one or more of the following conditions is satisfied: the hashed identifier was not computed with a hash key stored by the entity, the hashed identifier does not match a hashed identifier generated or stored by the entity, and the hash identifier does not correspond to a tracking device associated with the entity. In some embodiments, the hashed identifier 1202 is associated with an entity 1210 when one or more of the following conditions is satisfied: the hashed identifier was computed with a hash key stored by the entity, the hashed identifier matches a hashed identifier generated or stored by the entity, and the hash identifier corresponds to a tracking device associated with the entity.

In the embodiment of FIG. 12, the entity 1210A and the entity 1210B respond to the query by the mobile device 102 indicating that the hashed identifier 1202 is not associated with the entity 1210A and the entity 1210B, respectively. The entity 1210C, in response to determining that the hashed identifier 1202 is associated with the entity 1210C, informs the mobile device 102 that the hashed identifier is associated with the entity 1210C. In some embodiments, the entity 1210C informs that mobile device 102 that the hashed identifier 1202 is associated with the entity 1210C by providing a public key stored by the entity associated with the hashed identifier, associated with the hash key used to generate the hashed identifier, associated with the tracking device 106, or otherwise selected based on the hashed identifier. In other embodiments, the entity 1210C sends a communication indicating the association between the hashed identifier 1202 and the entity 1210C, and in response to receiving the communication, the mobile device 102 requests a public key from the entity 1210C (for instance, using the same or a different API used to query the entity 1210C with the hashed identifier). In response to this request, the entity 1210C provides a public key stored by the entity associated with the hashed identifier 1202, associated with the hash key used to generate the hashed identifier, associated with the tracking device 106, or otherwise selected based on the hashed identifier.

In response to receiving the public key 1218, the mobile device 102 accesses a location of the mobile device and encrypts location data representative of the accessed location using the public key using the encryption engine 1206. In some embodiments, the mobile device 102 activates a GPS receiver of the mobile device in response to receiving the public key 1218 to access the location of the mobile device. In other embodiments, the mobile device 102 determines the location of the mobile device in advance of receiving the public key 1218, and encrypts location data representative of the location in response to receiving the public key. The encryption engine 1206 may perform any suitable public/private key pair encryption operation to encrypt the location data, for example Diffie-Hellman encryption, ElGamal encryption, RSA encryption, and the like.

The mobile device 102 then provides the encrypted location data 1220 to the entity 1210C for storage in the location store 1216C. For instance, the entity 1210C can store the encrypted location data 1220 in a "most recent location" field corresponding to the tracking device 106 within the location store 126C.

An owner device 1224, such as a mobile phone or computer belonging to an owner of the tracking device 106, requests and receives the encrypted location data 1220 from the entity 1210C. For instance, the owner device 1224 can execute a tracking device application corresponding to the entity 1210C, can navigate to a portion of the application associated with displaying a location of the tracking device 106, and the application, in response, can request the location of the tracking device from the entity 1210C. The entity 1210C, in response to receiving the request, provides the encrypted location data 1220 to the owner device 1224.

The owner device 1224 includes a private key 1226, a decryption engine 1228, and an interface 1230. The private key 1226 corresponds to the public key 1218. In some embodiments, the owner device 1224 includes a different private key that corresponds to each public key stored by the entity 1210C for use by the mobile device 102 in encrypting location data. For instance, the tracking device 106 can be associated with any number of distinct private/public key pairs, with the public keys stored by an entity 1210 and the private keys stored by the owner device 1224. In other embodiments, the owner device 1224 stores a single private key 1226 that corresponds to all public keys stored by the entity 120C (for instance, a single private key that corresponds to a set of diversified public keys as described above).

The decryption engine 1228 of the owner device 1224, in response to receiving the encrypted location data 1220, decrypts the encrypted location data 1220 using the private key 1226 to produce decrypted location data representative of the location of the mobile device 102 at the time the mobile device detected the tracking device 106. The decrypted location data can then be displayed to a user of the owner device 1224, for instance within a map interface, as a set of GPS coordinates, with text describing the location represented by the decrypted location data (e.g., a name of a city, a place of business, a landmark, a street name or interactions), or within any other suitable user interface.

By encrypting the location data at the mobile device 102, the location data is protected from the point of access, throughout the environment 1200, until the encrypted location data is received by the owner device 1224. In embodiments where the mobile device 102 and the entities 1210 do not have access to the private key corresponding to the public key 1218 used to encrypt the location data, no system or entity between the mobile device 102 and the owner device 1224 is able to decrypt the encrypted location data 1220. Likewise, the identity of the tracking device 106 is hashed and protected such that the mobile device 102 or any other entity that detects the tracking device 106 is able to determine the identity of the tracking device. Thus, the environment 1200 of FIG. 12 enables end-to-end protection of data that can identify either the tracking device 106 or the location of the mobile device 102 at the moment it detects the tracking device.

In some embodiments, the entity 1210C has access to the private key corresponding to the public key 1218 used to encrypt the location data. In such embodiments, the entity 1210C can decrypt the encrypted location data 1220, for instance when it is received or in response to being requested by the owner device 1224 or another authorized device. In embodiments where the encrypted location data 1220 is decrypted when it is received, the decrypted location data can be stored in the location store 1216C, and can be subsequently provided to an authorized device for display. Alternatively, the entity 1210C can store the encrypted location data 1220 within the location store 1216C, and can access the stored encrypted location data and decrypt it using the private key when requested.

In some embodiments, the advertising packet including the hash ID 1202 also includes an identification of a vendor (a "vendor ID"). The vendor ID can be used by the mobile device 102 to identify a server associated with an entity 1210 from which to request the public key 1218. Likewise, the vendor ID can be used by the mobile device to identify a server associated with an entity 1210 to which to provide the encrypted location data 1220. In some embodiments, the server from which the public key 1218 is requested is different from the server to which the encrypted location data 1220 is provided. In some embodiments, the vendor ID can direct a mobile device to difference servers depending on a manufacturer of the mobile device 102, a tracking application running on the mobile device, or any other characteristics of the mobile device. For instance, a first mobile device associated with a first manufacturer may, in response to receiving a vendor ID, request the public key 1218 from and provide the encrypted location data 1220 to a first server associated with an entity 1210, and a second mobile device associated with a second manufacturer may, in response to receiving the same vendor ID, request the public key 1218 from and provide the encrypted location data 1220 to a second server associated with the entity 1210.

Figure 13:
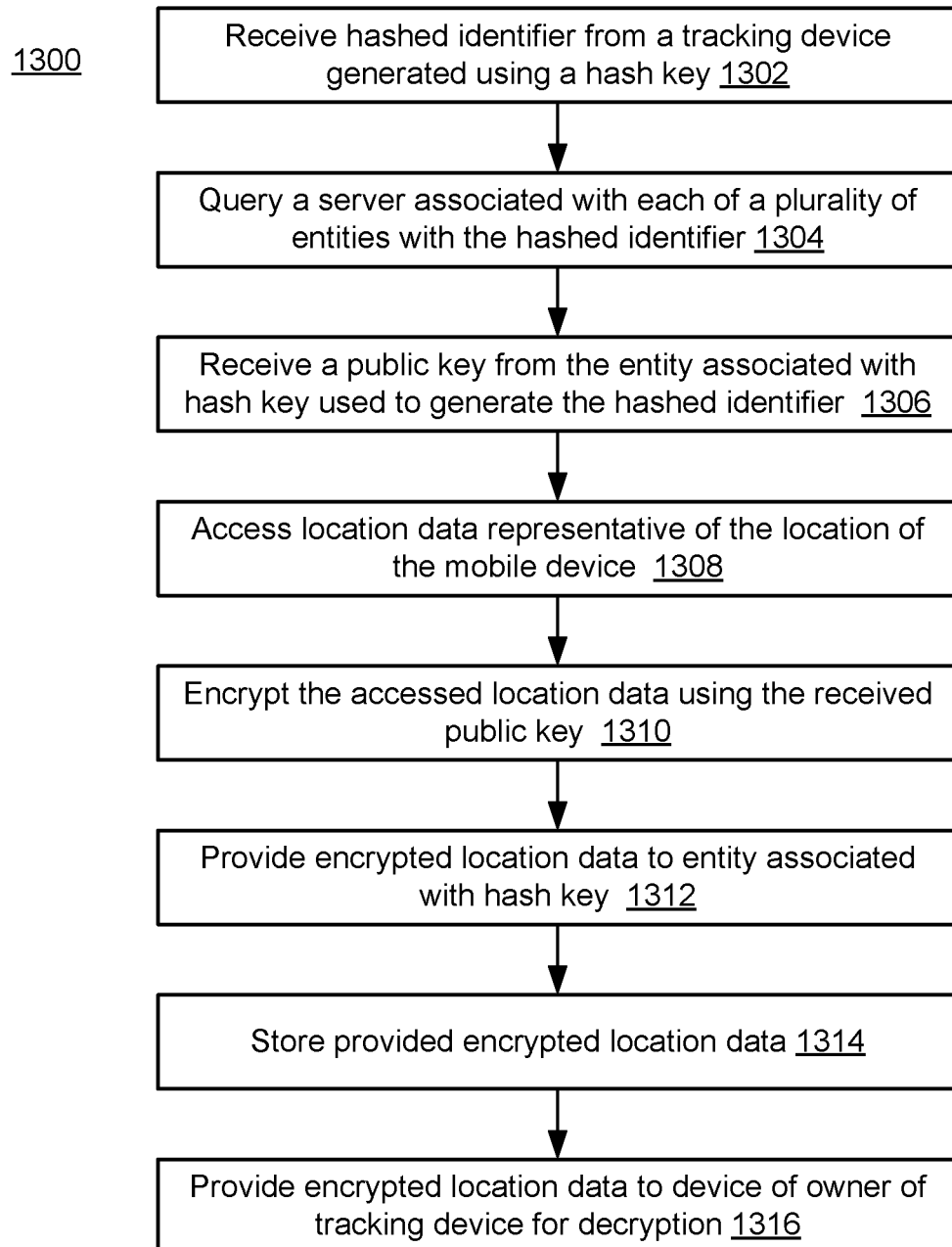
FIG. 13 illustrates a process for distributed key management in a tracking device environment, according to one embodiment.

FIG. 13 illustrates a process for distributed key management in a tracking device environment, according to one embodiment. It should be noted that the process 1300 described herein can include additional, fewer, or different steps than those described herein, and the steps can be performed in different orders than that described herein.

A hashed identifier transmitted by a tracking device is received 1302 by a mobile device. The hashed identifier is generated using a hash key stored by, generated by, and/or corresponding to the tracking device. The mobile device queries 1304 a server associated with each of a plurality of entities using the hashed identifier. In some embodiments, the plurality of entities are identified using a directory including an identifier representative of each of the plurality of entities (such as a URL or other link, an API, and the like).

The entity associated with the hash key used to generate the hashed identifier is identified. In some embodiments, each entity is configured to determine whether the hashed identifier can be generated using a set of hash keys stored by the entity and a set of identifiers associated with tracking devices associated with the entity. In other embodiments, each entity compares the hashed identifier to a list of hashed identifiers representative of tracking devices associated with the entity. In response to determining that the hashed identifier is associated with a hash key or a tracking device associated with the entity, the entity indicates to the mobile device that the hashed identifier is associated with the entity. The mobile device then receives 1306 a public key associated with the tracking device from the identified entity. In some embodiments, the mobile device, in response to receiving an indication that the identified entity is associated with the hashed identifier, requests the public key from the identified entity.

Location data representative of the location of the mobile device is accessed 1308, for instance in response to receiving the public key or in response to receiving the hashed identifier from the tracking device. The mobile device then encrypts 1310 the accessed location data using the public key, and provides 1312 the encrypted location data to the identified entity. The identified entity stores 1314 the encrypted location data, and provides 1316 the encrypted location data to a device of an owner of the tracking device for decryption when requested. The devices of the owner can then decrypt the encrypted location data, and can display the decrypted location data to a user of the device, for instance within a map interface.

Figure 14:
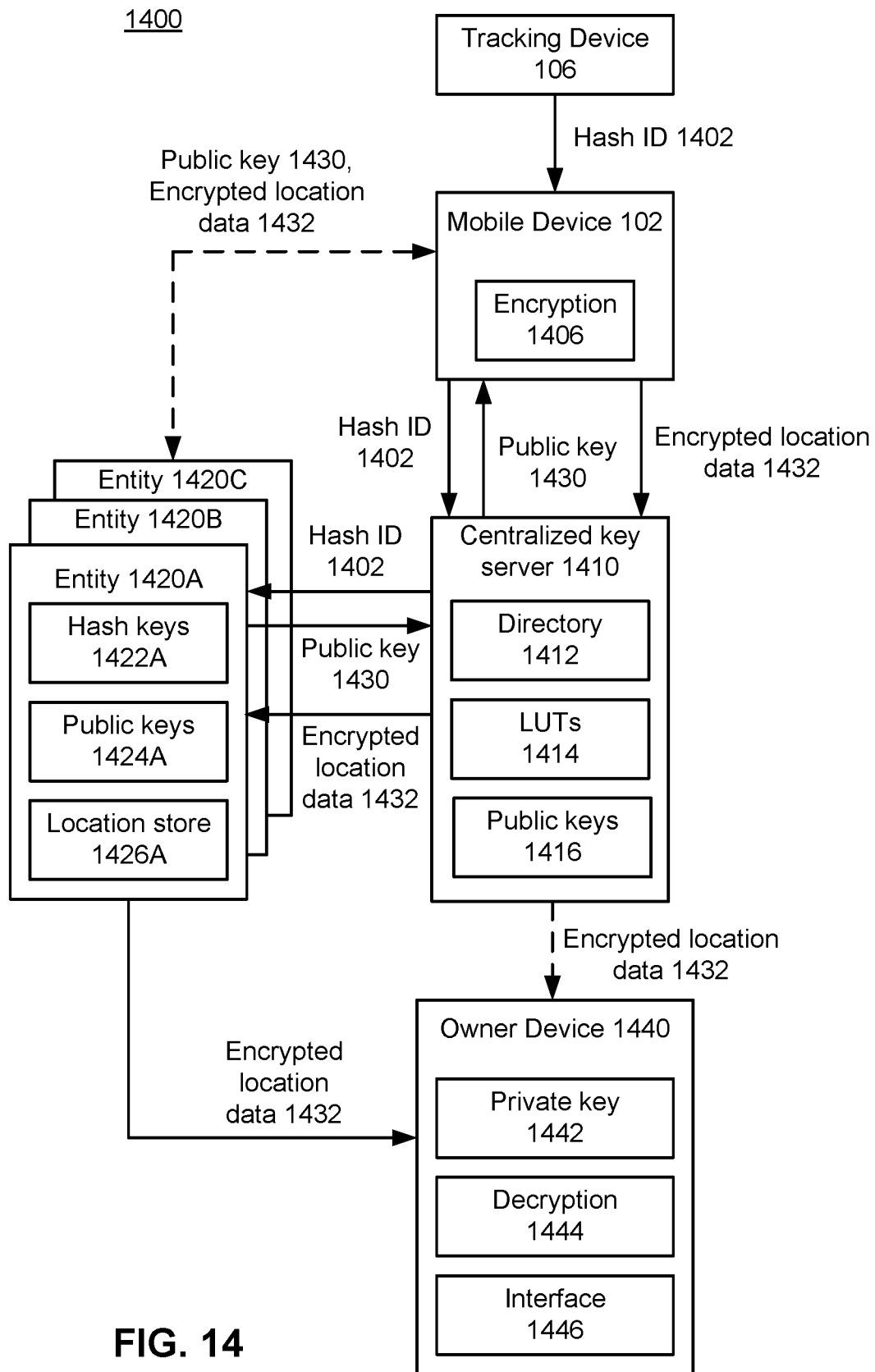
FIG. 14 is a system diagram illustrating distributed key management data flow in a tracking device environment with a centralized key server, according to one embodiment.

FIG. 14 is a system diagram illustrating distributed key management data flow in a tracking device environment with a centralized key server, according to one embodiment. The environment 1400 includes a tracking device 106, a detecting device (mobile device 102), a centralized key server 1410, a plurality of entities (entity 1420A, entity 1420B, and entity 1420C), and an owner device 1440.

Similar to the embodiment of FIG. 12, the tracking device 106 transmits a hashed identifier 1402 generated using a hash key, and the mobile device 102 detects the hashed identifier. Instead of directly querying the entities 1420 to identify the entity storing or associated with the hash key used to generate the hashed identifier 1402, the mobile device 102 queries a centralized key server 1410 with the hashed identifier. The centralized key server can be associated with one or more of the entities 1420, can be associated with a manufacturer or company associated with the tracking device 106 or the mobile device 102, can be associated with a third-party tracking service or encryption service, or can be associated with any other suitable entity.

The centralized key server 1410 can include, among other components, one or more of a directory 1412, a set of LUTs 1416, and a set of public keys 1416. The directory 1412 can be similar to the directory 1204, and can include links, APIs, or identifiers to each entity 1420. In some embodiments, the centralized key server 1410 can query each entity 1420 with the hashed identifier 1402 using the directory 1412 to identify the entity associated with the hash key used to generate the hashed identifier (or associated with the hashed identifier itself or the tracking device 106), and can receive a public key 1430 from the identified entity. As discussed above, the identified entity 1420 can hash an identifier for each tracking device associated with the identified 1420 using each hash key in the set of hash keys 1422 stored by the entity to determine if a generated hashed identifier matches the received hashed identifier 1420. In response to determining that the received hashed identifier 1402 is associated with a hash key stored by the identified entity 1420, the identified entity can access a public key associated with the hash key (or associated with the tracking device 106) from the stored set of public keys 1424, and can provide the accessed public key to the centralized key server 1410.

The centralized key server 1410 can then provide the public key to the mobile device 102, the mobile device can encrypt location data representative of a location of the mobile device using the public key, and can provide the encrypted location data 1432 to the centralized key server. The centralized key server 1410 can then provide the encrypted location data 1432 to the identified entity for subsequent storage in the location store 1426 of the identified entity. At a subsequent time, an owner device 1440 (similar to the owner device 1224) can request and receive the encrypted location data 1432 from the identified entity 1420, can decrypt (via the decryption engine 1444) the encrypted location data using a private key 1442 corresponding to the public key 1430 used to encrypt the location data, and can display the decrypted location data to a user of the owner device via an interface 1446 (such as a map interface).

In some embodiments, the centralized key server 1410, instead of directly querying each entity 1420, can query a set of LUTs 1414 stored by the centralized key server with the hashed identifier 1402. The set of LUTs 1414 can include a table for each entity 1420 that includes all hashed identifiers corresponding to the entity (e.g., identifiers of tracking devices associated with the entity that are hashed by each hash key corresponding to the tracking device stored by the entity). In response to identifying a hashed identifier stored by a LUT that matches the hashed identifier 1402, the centralized key server 1410 can identify the entity 1420 associated with the LUT, and can request the public key 1430 from the identified entity.

In some embodiments, instead of requesting the public key 1430 from the entity 1420, the centralized key server 1410 can store the public keys associated with each entity 1420 (or associated with each tracking device associated with the entities 1420) within a public keys store 1416 at the centralized key server. In response to identifying the entity 1420 associated with the hashed identifier 1402, the centralized key server 1410 can identify the public key 1430 to provide to the mobile device 102, for instance by identifying the public key associated with the hashed identifier (e.g., each LUT can map a public key within the public keys store 1416 to a hashed identifier within the LUT).

In some embodiments, instead of requesting and receiving the public key 1430 from the identified entity 1420 (and subsequently providing the public key to the mobile device 102), the centralized key server can provide the identity of the identified entity to the mobile device 102. In such embodiments, the mobile device can request the public key 1430 directly from the identified entity 1420 (for instance, using a link or API provided or identified by the centralized key server 1410, by querying a directory associated with the entities 1420, and the like). Likewise, instead of providing the encrypted location data 1432 to the centralized key server 1410, the mobile device 102 can instead provide the encrypted location data 1432 directly to the identified entity 1420.

In some embodiments, the centralized key server 1410 can provide the encrypted location data 1432 directly to the owner device 1440 (as opposed to first providing the encrypted location data to the identified entity 1420). In such embodiments, the owner device 1440 can request location data associated with the tracking device 106 directly from the centralized key server 1410.

In some embodiments, the centralized key server 1410 can store the private key associated with the public 1430. In such embodiments, the centralized key server 1410 can store the encrypted location data 1432 and can decrypt it using the stored private key when requested by the owner device 1440. Alternatively, the centralized key server 1410 can decrypt the encrypted location data 1432 when received using the stored private key and can store the decrypted location data.

In some embodiments, the mobile device 102 can provide location data representative of the location of the mobile device to the centralized key server 1410 without encrypting the location data. In such embodiments, instead of providing the public key 1430 to the mobile device 102, the centralized key server 1410 can encrypt the received location data on behalf of the mobile device using the public key, and can store the encrypted received location data 1432 or can provide the encrypted received location data to the identified entity 1420 associated with the hashed identifier 1402. In such embodiments, the location data of the mobile device 102 is not protected end-to-end, but the mobile device can beneficially offload encryption operation functionality to the centralized key server 1410 (for instance, in embodiments where the communicative connection between the mobile device and the centralized key server is trusted or secure).

It should be noted that in the embodiments of FIGS. 12 and 14, the mobile device 102 can, when providing encrypted location data to an entity 1210, an entity 1420, or the centralized key server 1410, include the hashed identifier received from the tracking device 106. This allows the system receiving the encrypted location data (whether the entity 1210, the entity 1420, or the centralized key server 1410) to be able to identify the tracking device 106, and to store the encrypted location data in conjunction with the identity of the tracking device. In some embodiments, the entity 1210 or the centralized key server 1410 can instead identify the tracking device 106 based on the hashed identifier received from the mobile device 102 when the mobile device queries the entity 1210 or the centralized key server 1410 to identify an entity associated with the hashed identifier. In such embodiments, the entity 1210 or the centralized key server 1410 can remember the hashed identifier when queried by the mobile device 102, and can associate subsequently received encrypted location data 1432 with the identity of the tracking device determined from the remembered hashed identifier.

Figure 15:
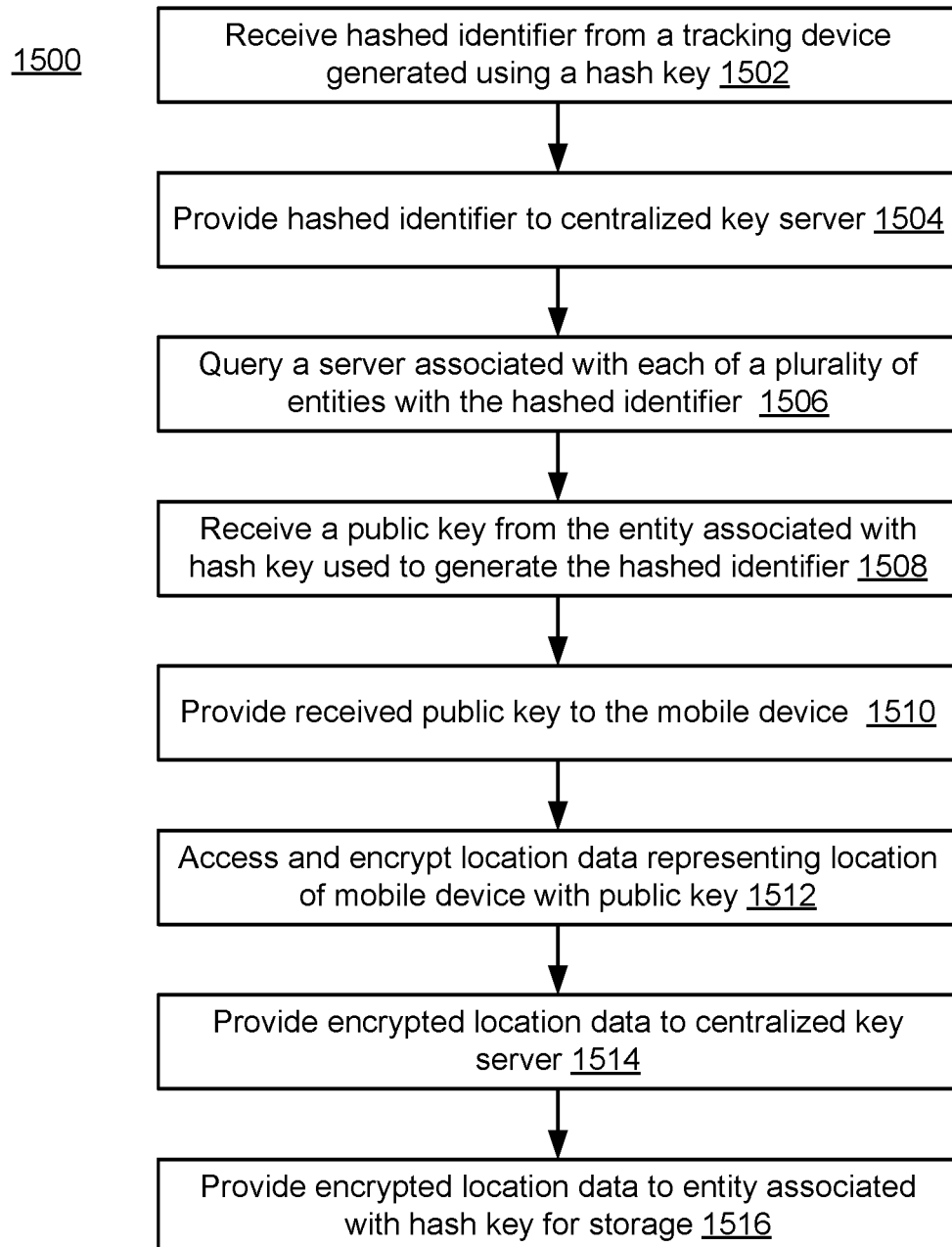
FIG. 15 illustrates a process for distributed key management in a tracking device environment with a centralized key server, according to one embodiment.

FIG. 15 illustrates a process for distributed key management in a tracking device environment with a centralized key server, according to one embodiment. It should be noted that the process 1500 described herein can include additional, fewer, or different steps than those described herein, and the steps can be performed in different orders than that described herein.

A hashed identifier generated using a hash key is received 1502 by a mobile device from a tracking device. The hashed identifier is provided 1504 by the mobile device to a centralized key server. The centralized tracking server queries 1506 a server associated with each of a plurality of entities using the hashed identifier. An entity of the plurality of entities associated with the hashed identifier is identified, and a public key is received 1508 by the centralized key server from the identified entity.

The centralized key server provides 1510 the received public key to the mobile device. The mobile device then accesses and encrypts 1512 location data representative of the location of the mobile device using the received public key. The encrypted location data is provided 1514 by the mobile device to the centralized key server, which then provides 1516 the encrypted location data to the identified entity. The identified entity can subsequently provide the encrypted location data to an owner device associated with the tracking device, which can decrypt the encrypted location data using a private key corresponding to the public key used to encrypt the location data. The owner device can then display the decrypted location data, for instance within a map interface.

It should be noted that in some embodiments described herein, a user of the owner device can request one or more locations of the tracking device 106 from an entity (such as an entity 1210 or 1420) associated with the tracking device. For instance, the user can provide a hashed identifier or a public key, and the entity can provide a location associated with the hashed identifier or the public key (e.g., the location of the mobile device 102 when the mobile device received the hashed identifier or used the public key to encrypt the location data). Likewise, the user can provide security credentials (e.g., an account identifier associated with the tracking device 106, a password, and the like) to the entity, and the entity can provide a set of locations associated with the tracking device (such as a threshold number of most recent locations, all locations within a time interval, and the like).

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
  receiving, by a mobile device, a hashed identifier from a tracking device, the tracking device configured to compute the hashed identifier using a hash key, the hashed identifier corresponding to the tracking device;
  querying, by the mobile device, a server associated with each of a plurality of entities within a directory with the hashed identifier, each entity within the directory associated with a set of hash keys and associated with a set of tracking devices, wherein each entity is configured to compute a candidate hashed identifier for each combination of hash key in the set of hash keys associated with the entity and tracking device in the set of tracking devices associated with the entity;

receiving, by the mobile device, a public key from a server associated with a first entity of the plurality of entities associated with the hash key used to compute the hashed identifier, the public key associated with the tracking device;

accessing, by the mobile device, location data representative of a location of the mobile device;

encrypting, by the mobile device, the accessed location data using the public key to produce encrypted location data; and providing, by the mobile device, the encrypted location data to the first entity.

2. The method of claim 1, wherein querying a server associated with an entity comprises accessing a link listed within the directory associated with the server.

3. The method of claim 1, wherein querying a server associated with an entity comprises accessing a first API associated with the server.

4. The method of claim 3, wherein receiving the public key from the server comprises receiving the public key via a second API associated with the server.

5. The method of claim 1, wherein each entity is configured to compute the candidate hashed identifiers in advance of being queried by the mobile device.

6. The method of claim 1, wherein each entity is configured to compute the candidate hashed identifiers in response to being queried by the mobile device.

7. The method of claim 1, wherein each entity determines that the entity is associated with the hash key used to compute the hashed identifier in response the hashed identifier matching one of the candidate hashed identifiers computed by the entity.

8. The method of claim 1, wherein the first entity, in response to determining that the first entity is associated with the hash key used to compute the hashed identifier, is configured to provide an indication to the mobile device that the first entity is associated with the hash key used to compute the hashed identifier.

9. The method of claim 8, wherein the mobile device, in response to receiving the indication that the first entity is associated with the hash key used to compute the hashed identifier, is configured to request the public key from the first entity via a link or API associated with the first entity, and wherein the first entity, in response to receiving the request, is configured to provide the public key to the mobile device.

10. The method of claim 1, wherein the mobile device does not provide an indication to a user of the mobile device that the mobile device received the hashed identifier or detected the tracking device.

11. The method of claim 1, wherein the mobile device does not provide an indication to a user of the mobile device that the mobile device encrypted the location data or provided the encrypted location data to the first entity.

12. The method of claim 1, wherein the public key is associated with a corresponding private key, wherein the first entity is configured to provide the encrypted location data to a device of an owner of the tracking device, and wherein the device of the owner is configured to decrypt the location data using the private key.

13. The method of claim 12, wherein the device of the owner is configured to determine the location of the mobile device based on the decrypted location data, and to display the location of the mobile device within a map interface.

14. The method of claim 1, wherein the public key is associated with a corresponding private key, wherein the first entity has access to the corresponding private key, and wherein the first entity is configured to decrypt the encrypted location data and store the decrypted location data.

15. The method of claim 1, wherein the first entity is configured to store the encrypted location data as a last known location of the tracking device.

16. The method of claim 1, wherein the public key comprises a diversified public key of a set of diversified public keys, each associated with a same private key.

17. The method of claim 1, wherein each entity of the plurality of entities comprises an independent company.

18. A mobile device comprising a hardware processor and a non-transitory computer-readable storage medium storing executable instructions that, when executed by the hardware processor, cause the hardware processor to perform steps comprising:

receiving, by the mobile device, a hashed identifier from a tracking device, the tracking device configured to compute the hashed identifier using a hash key, the hashed identifier corresponding to the tracking device;

querying, by the mobile device, a server associated with each of a plurality of entities within a directory with the hashed identifier, each entity within the directory associated with a set of hash keys and associated with a set of tracking devices, wherein each entity is configured to compute a candidate hashed identifier for each combination of hash key in the set of hash keys associated with the entity and tracking device in the set of tracking devices associated with the entity;

receiving, by the mobile device, a public key from a server associated with a first entity of the plurality of entities associated with the hash key used to compute the hashed identifier, the public key associated with the tracking device;

accessing, by the mobile device, location data representative of a location of the mobile device;

encrypting, by the mobile device, the accessed location data using the public key to produce encrypted location data; and providing, by the mobile device, the encrypted location data to the first entity.

19. A non-transitory computer-readable storage medium storing executable instructions that, when executed by a hardware processor of a mobile device, cause the hardware processor to perform steps comprising:

receiving, by the mobile device, a hashed identifier from a tracking device, the tracking device configured to compute the hashed identifier using a hash key, the hashed identifier corresponding to the tracking device;

querying, by the mobile device, a server associated with each of a plurality of entities within a directory with the hashed identifier, each entity within the directory associated with a set of hash keys and associated with a set of tracking devices, wherein each entity is configured to compute a candidate hashed identifier for each combination of hash key in the set of hash keys associated with the entity and tracking device in the set of tracking devices associated with the entity;

receiving, by the mobile device, a public key from a server associated with a first entity of the plurality of entities associated with the hash key used to compute the hashed identifier, the public key associated with the tracking device;

accessing, by the mobile device, location data representative of a location of the mobile device;

encrypting, by the mobile device, the accessed location data using the public key to produce encrypted location data; and providing, by the mobile device, the encrypted location data to the first entity.

\* \* \* \* \*